(12) United States Patent
McCrea et al.

(10) Patent No.: US 10,039,225 B2
(45) Date of Patent: *Aug. 7, 2018

(54) LAND ROLLER

(71) Applicant: AG Shield Ltd., Benito (CA)

(72) Inventors: David Gary McCrea, Benito (CA); Thomas Edward McCrea, Benito (CA)

(73) Assignee: AG Shield Ltd., Benito (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,840

(22) Filed: Nov. 16, 2016

(65) Prior Publication Data

US 2017/0055431 A1    Mar. 2, 2017

Related U.S. Application Data

(62) Division of application No. 14/277,982, filed on May 15, 2014, now Pat. No. 9,538,698, which is a division (Continued)

(51) Int. Cl.
| | | |
|---|---|---|
| *A01B 29/02* | (2006.01) | |
| *A01B 49/06* | (2006.01) | |
| *A01B 63/22* | (2006.01) | |
| *A01B 63/32* | (2006.01) | |
| *A01B 69/00* | (2006.01) | |

(Continued)

(52) U.S. Cl.
CPC ............ *A01B 73/067* (2013.01); *A01B 29/02* (2013.01); *A01B 49/06* (2013.01); *A01B 63/22* (2013.01); *A01B 63/32* (2013.01); *A01B 69/00* (2013.01); *A01C 5/068* (2013.01)

(58) Field of Classification Search
CPC ......... A01B 29/02; A01B 29/00; A01B 49/06; A01B 49/04; A01B 49/00; A01B 63/22; A01B 63/16; A01B 63/14; A01B 63/00; A01B 63/32; A01B 63/24; A01B 69/00; A01B 73/067; A01B 73/06; A01B 73/02;
(Continued)

(56) References Cited

U.S. PATENT DOCUMENTS

| | | |
|---|---|---|
| 6,119,792 A | 9/2000 | Almer |
| 8,820,428 B2 | 9/2014 | McCrea |
| 2008/0314605 A1 | 12/2008 | Degelman et al. |

FOREIGN PATENT DOCUMENTS

| | | |
|---|---|---|
| CA | 2635377 | 12/2008 |
| CA | 2719664 | 5/2011 |

*Primary Examiner* — Christopher J. Novosad
(74) *Attorney, Agent, or Firm* — Ryan W. Dupuis; Ade + Company Inc.; Kyle R. Satterthwaite

(57) ABSTRACT

A land roller implement includes a wheel aligned with the respective gap between the inner roller and the outer roller of each wing in which the wheel is pivotal between a packing position in the working position of the rollers and a transport position supporting the rollers in the transport position of the implement. The wings can also include a drive motor associated with each transport wheel to drive forward rotation of the wheel for displacing the wings from the transport position to the working position without displacing the implement in a rearward direction. A levelling beam attachment and a seeding attachment can also optionally be used on the land roller implement. Optional latchable brace members pivotally supported on the wings may provide additional support to the wings when using the levelling beam attachment.

8 Claims, 17 Drawing Sheets

Related U.S. Application Data of application No. 12/916,084, filed on Oct. 29, 2010, now Pat. No. 8,820,428.

(60) Provisional application No. 61/258,092, filed on Nov. 4, 2009, provisional application No. 61/296,190, filed on Jan. 19, 2010.

(51) Int. Cl.
*A01B 73/06* (2006.01)
*A01C 5/06* (2006.01)

(58) Field of Classification Search
CPC ......... A01B 73/00; A01C 5/068; A01C 5/066; A01C 5/06; A01C 5/00
USPC .... 172/799.5, 170, 171, 174–176, 179, 185, 172/187, 199, 327, 407, 413, 423, 457, 172/452, 536, 311, 459, 460; 111/130, 111/925, 926, 900, 200
See application file for complete search history.

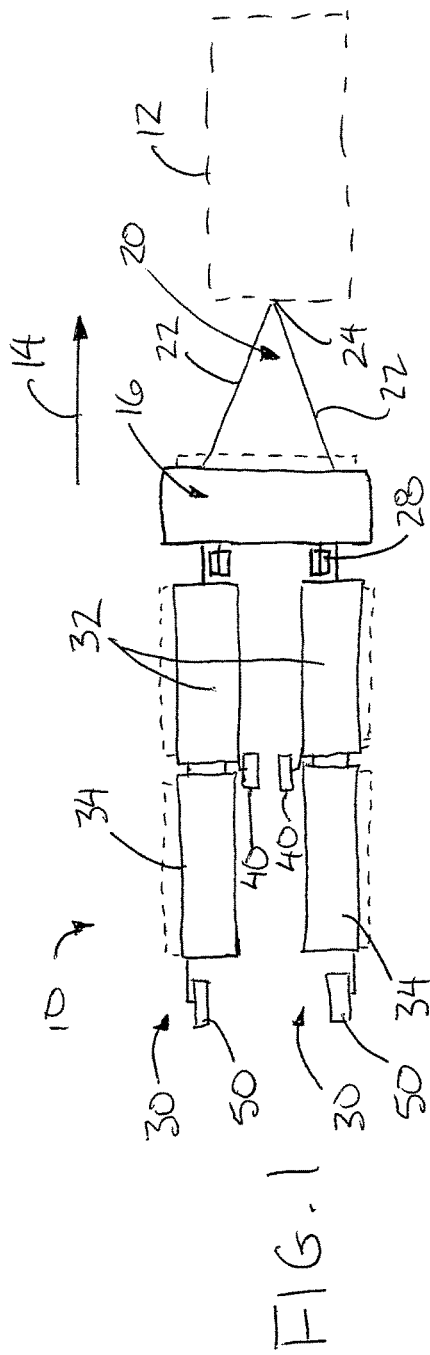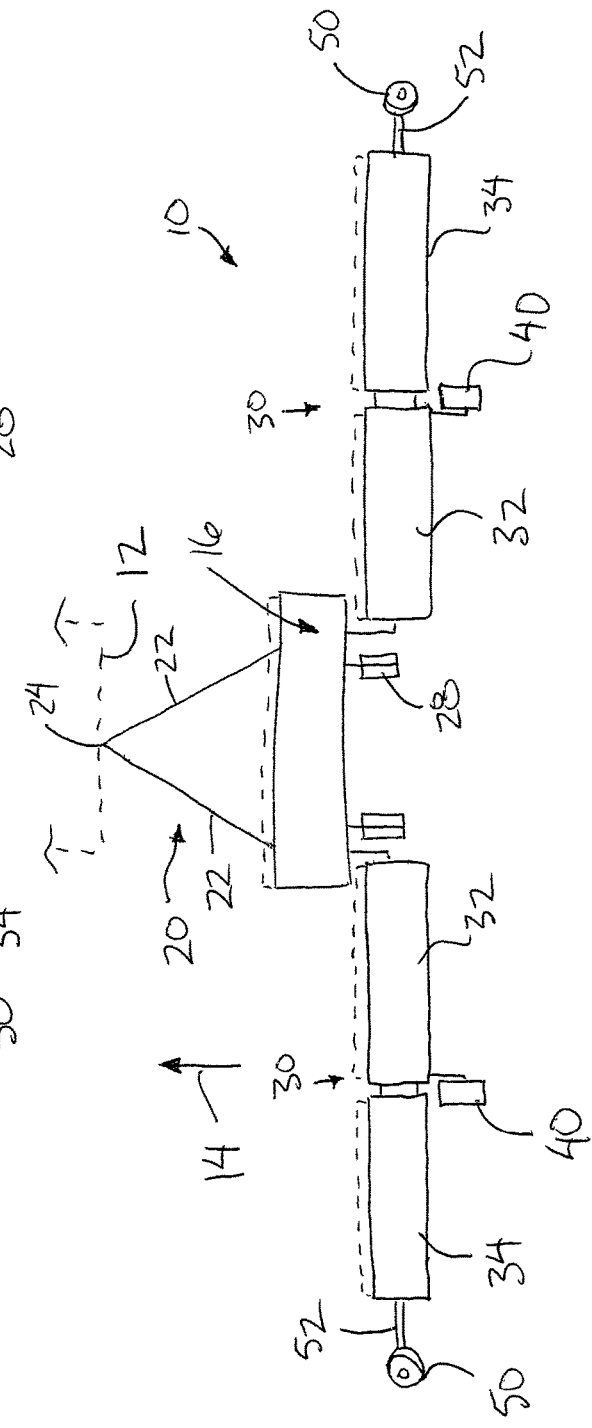

LAND ROLLER

This application is a divisional application of U.S. patent application Ser. No. 14/277,982, filed Oct. 15, 2014, which is a divisional of US parent application Ser. No. 12/916,084, filed Oct. 29, 2010 and issued Nov. 3, 2011 under U.S. Pat. No. 8,820,428, and also claims the benefit under 35 U.S.C. 119(e) of U.S. provisional application Ser. No. 61/258,092, filed Nov. 4, 2009 and U.S. provisional application Ser. No. 61/296,190, filed Jan. 19, 2010.

FIELD OF THE INVENTION

The present invention relates to an agricultural land roller implement of the type comprising a plurality of rollers arranged to be towed in a forward working direction by a towing vehicle, for example an implement comprising a centre section with a central roller and a pair of wings with additional rollers in which the wings are arranged to be displaced between a forward working position and a trailing transport position. The present invention also relates to improvements to a land roller including a ground levelling device ahead of the rollers and a cover crop roller device arranged for selective attachment to the rollers.

BACKGROUND

Land rollers are used for soil compaction and terrain flattening in various applications, including agriculture. In agriculture, farmers use land rollers prior to planting and ploughing to develop a consistent surface with uniform soil density to aid in the planting, growing and cultivation of plants. Various other agricultural uses are known including packing seed beds, or pushing rocks and other debris into the ground for example.

One example of a land roller is disclosed in Canadian patent application 2,635,377 by Degelman et al. In this instance a central roller is provided behind which two wings are pivotally coupled for movement between laterally outward field working positions and rearward trailing transport positions. Each of the wings includes an inner roller and an outer roller in which the outer roller is positioned rearward of the inner roller to permit some overlap between the two rollers. In the transport position a considerable overall width is required due to the overlap between the rollers.

U.S. Pat. No. 6,119,792 by Almer discloses a further example of a land roller in which the rollers on the wings are in line with the central roller and pivot upwardly into a transport position. In this instance the rollers on the wings are accordingly much smaller than the central roller to permit their lifting into the transport position. Due to the rollers being in line with one another, a gap is provided between adjacent rollers requiring additional trailing rollers at the gaps which add to the mass and size of the wings.

In some instances it is desirable to tow the land roller behind other implements, for example a seeder. Using wings which fold rearwardly into the transport position such as disclosed above with regard to Degelman requires that the implement be displaced rearwardly to deploy the wings from the transport position to the forward working position. Such a movement is not possible when a plurality of implements are connected in series so that one is typically limited to smaller rollers such as disclosed in Almer in such an instance.

In other instances it is desirable to level protruding mounds of earth ahead of the roller to provide a more level and consistent surface being packed. Typical attempts in the prior art to do so required vary large and heavy beams to resist damage when encountering obstacles. The heavy beams are very short and only used with small rollers due to the considerable strength required to prevent damage thereof. To further protect the beams, known designs require a breakaway mounting of the beams which permits upward release of the beam similar to a cultivator trip. The resulting complexity of multiple heavy beams with release mechanisms associated therewith is very complex in construction and results in a very wide transport width due to the excess material and equipment provided.

In further instances, it is desirable to use rollers for flattening a cover crop. A cover crop roller typically comprises a roller drum with various lugs or protrusions projecting radially outward therefrom for engaging the crop. The protrusions are required on the roller for crimping the crop to effectively flatten the cover crop. As the lugs are essential for crimping, conventional cover crop rollers are typically dedicated to the single use of rolling cover crops.

In some instances seeding kits are used with land rollers to assist with pasture renovation. Many growers are adding a self fertilizing legume to the grass pastures, or adding grass seed to existing pastures. Others are known to mount an airflow unit on the frame of the land roller which is available by Valmar. This unit has a wide transport with the tiny seeds being dropped 30 or more inches in height making the operation a no wind or slow wind at best operation only.

SUMMARY OF THE INVENTION

According to one aspect of the invention there is provided a land roller implement for rolling movement across the ground in a forward working direction of a towing vehicle, the implement comprising:

a central frame;

a hitch member connected to the central frame and arranged for connection to the towing vehicle for movement therewith in the forward working direction;

a first wing which is elongate in a longitudinal direction between an inner end pivotally coupled on the central frame and an opposing outer end;

a second wing which is elongate in a longitudinal direction between an inner end pivotally coupled on the central frame and an opposing outer end;

the first and second wings being pivotal about respective upright axes between respective working positions spanning laterally outward in opposing directions from the central frame so as to be oriented transversely to the forward working direction and respective transport positions extending rearwardly from the central frame such that the longitudinal direction of the first and second wings extends generally in the forward working direction;

each of the first wing and the second wing comprising an inner roller and an outer roller supported on the wing for rolling movement in the forward working direction in the working position of the wings;

the inner roller and the outer roller of each wing being spaced apart in the longitudinal direction of the wing by a respective gap between the rollers;

each of the first wing and the second wing further comprising a wheel axle rotatably supporting a packer wheel thereon in which the wheel axle is supported on the wing for pivotal movement about an upright axis relative to the wing between a transport position in which the wheel axle is oriented transversely to the longitudinal direction of the wing such that the wheel is supported for rolling movement in the forward working direction in the transport position of the wings and a working position in which the wheel axle is oriented substantially parallel to the longitudinal direction of the wing such that the wheel is supported for rolling movement in the forward working direction in the working position of the wings;

each packer wheel being aligned with the respective gap between the inner roller and the outer roller of the respective wing in the working position of the wheel axle.

By providing a transport wheel which is aligned with the gap between a plurality of rollers in series, and which is pivotal into a working position from a transport position, a single wheel can provide both functions of supporting the rollers for transport as well as packing the gap between a plurality of rollers connected in series. The connection of the rollers in series minimizes the width of the implement in the transport position.

When each wing comprises an inner frame and an outer frame pivotally coupled to one another about horizontal axis oriented in the forward working direction in the working position of the wings, preferably each of the inner frame and the outer frame support a respective roller thereon. The packer wheel is preferably supported on an outer end of the inner frame of each wing.

A height control actuator may be associated with each packer wheel so as to be arranged to lower the packer wheel below the respective rollers in the transport position and to level the packer wheel with the respective rollers so as to apply a substantially even packing pressure therewith in the working position.

Each of the first wing and the second wing preferably further comprises a wheel axle rotatably supporting a transport wheel on an outer end thereof. The wheel axle may be supported on the wing for pivotal movement about an upright axis relative to the wing between a transport position in which the wheel axle is oriented transversely to the longitudinal direction of the wing such that the wheel is supported for rolling movement in the forward working direction in the transport position of the wings and a working position in which the wheel axle is oriented substantially parallel to the longitudinal direction of the wing such that the wheel is supported for rolling movement in the forward working direction in the working position of the wings.

In some embodiments, a drive motor is associated with each transport wheel in which the drive motor is arranged to drive forward rotation of the wheel in the working position of the wheel so as to be arranged for displacing the respective wing from the transport position to the working position.

According to a second aspect of the present invention there is provided an agricultural implement for movement across the ground in a forward working direction of a towing vehicle, the implement comprising:

a central frame;

a hitch member connected to the central frame and arranged for connection to the towing vehicle for movement therewith in the forward working direction;

a first wing which is elongate in a longitudinal direction between an inner end pivotally coupled on the central frame and an opposing outer end;

a second wing which is elongate in a longitudinal direction between an inner end pivotally coupled on the central frame and an opposing outer end;

the first and second wings being pivotal about respective upright axes between respective working positions spanning laterally outward in opposing directions from the central frame so as to be oriented transversely to the forward working direction and respective transport positions extending rearwardly from the central frame such that the longitudinal direction of the first and second wings extends generally in the forward working direction;

each of the first wing and the second wing further comprising a wheel axle rotatably supporting a drive wheel thereon in which the wheel axle is supported on the wing for pivotal movement about an upright axis relative to the wing between a transport position in which the wheel axle is oriented transversely to the longitudinal direction of the wing such that the wheel is supported for rolling movement in the forward working direction in the transport position of the wings and a working position in which the wheel axle is oriented substantially parallel to the longitudinal direction of the wing such that the wheel is supported for rolling movement in the forward working direction in the working position of the wings;

a drive motor associated with each wing in which the drive motor is arranged to drive forward rotation of a respective one of the drive wheels in the working position of the wheel so as to be arranged for displacing the respective wing from the transport position to the working position.

By further providing a drive motor arranged to drive a drive wheel at the outer ends of the wings, the wings can be driven forward from the transport position to the forward working position without the implement being displaced either forwardly or rearwardly across the ground. A large land roller implement with a narrow transport width is thus readily adaptable for use with a series of implements unlike any prior art device. By further providing a motor output which only engages the wheel in the working position, the motor is arranged to automatically disengage contact with the drive wheel in the transport position such that the wheel is free rolling when being towed in the transport position.

The drive motor may be arranged to be disengaged with the respective drive wheel responsive to displacement of the wheel into the transport position.

Preferably each drive wheel is supported on the respective wing adjacent a rear outer end of the wing.

There may be provided an actuator arranged to displace each drive wheel upward relative to the respective wing in the working position.

When each of the first wing and the second wing comprises an inner roller and an outer roller supported on the wing for rolling movement in the forward working direction in the working position of the wings in which the inner roller and the outer roller of each wing are spaced apart in the longitudinal direction of the wing by a respective gap between the rollers, each drive wheel may be aligned with the respective gap between the inner roller and the outer roller of the respective wing in the working position of the wheel axle so as to be arranged for packing.

The drive motor is preferably arranged to drive rotation of an output drive roller, the output drive roller being arranged to engage an outer periphery of the drive wheel in a working position of the drive wheel.

The output drive roller may comprise an open frame including a plurality of traction members circumferentially spaced about an axis of rotation of the output drive roller so as to be arranged for engaging the drive wheel.

Each traction member preferably spans a full width of the drive wheel in an axial direction between opposing ends of the output drive roller and comprises a concave outer surface arranged for substantially mating with a convex profile of the drive wheel.

There may be provided a hydraulic steering actuator associated with each wheel axle and arranged to displace the drive wheel relative to the respective wing between the working position and the transport position thereof. When the drive motor comprises a hydraulic orbit motor, preferably the hydraulic actuator and the drive motor are coupled by sequencing valves such that the hydraulic actuator and the drive motor are operable in sequence with one another by a single controller actuation to displace the first and second wings between the transport and working positions respectively.

According to another aspect of the present invention there is provided an agricultural implement for movement across the ground in a forward working direction of a towing vehicle, the implement comprising:

a central frame;

a hitch member connected to the central frame and arranged for connection to the towing vehicle for movement therewith in the forward working direction;

a first wing which is elongate in a longitudinal direction between an inner end and an opposing outer end;

a second wing which is elongate in a longitudinal direction between an inner end and an opposing outer end; and first and second pivot assemblies pivotally coupling respective ones of the inner ends of the first and second wings on the central frame such that the first and second wings are pivotal about respective upright axes between respective working positions spanning laterally outward in opposing directions from the central frame so as to be oriented transversely to the forward working direction and respective transport positions extending rearwardly from the central frame such that the longitudinal directions of the first and second wings extend generally in the forward working direction;

each pivot assembly comprising:

an upright pivot shaft supported on the central frame so as to define the respective upright axis of pivotal movement of the respective wing between the working and transport positions;

a knuckle member coupled to the upright pivot shaft so as to be arranged for pivotal movement about the upright axis and so as to be arranged for vertical sliding movement along the upright axis relative to the central frame; and a horizontal pivot shaft supported on the knuckle member for movement therewith relative to the central frame;

the respective wing being coupled to the horizontal pivot shaft so as to be arranged for pivotal movement relative to the knuckle member about a horizontal axis of the horizontal pivot shaft and so as to be arranged for movement with the horizontal pivot shaft relative to the central frame.

The vertical movement between the inner end of the wings and the central frame allows land packer rollers on the wings to be supported at a different elevations than a land packer roller on the central frame while the rollers remain substantially parallel to one another and the ground so that the implement is better able to follow contours of the ground.

Each horizontal pivot shaft may be substantially perpendicular to the longitudinal direction of the respective wing so as to be oriented substantially in the forward working direction in the working position of the wings.

According to another aspect of the present invention there is provided an agricultural implement for movement across the ground in a forward working direction of a towing vehicle, the implement comprising:

a central frame;

a hitch member connected to the central frame and arranged for connection to the towing vehicle for movement therewith in the forward working direction;

a first wing which is elongate in a longitudinal direction between an inner end pivotally coupled on the central frame and an opposing outer end;

a second wing which is elongate in a longitudinal direction between an inner end pivotally coupled on the central frame and an opposing outer end;

the first and second wings being pivotal about respective upright axes between respective working positions spanning laterally outward in opposing directions from the central frame so as to be oriented transversely to the forward working direction and respective transport positions extending rearwardly from the central frame such that the longitudinal directions of the first and second wings extend generally in the forward working direction;

a first brace member coupled to the first wing for pivotal movement relative to the first wing about a first axis extending generally in the longitudinal direction of the first wing such that in the working position of the first wing the first brace member is pivotal between latched position extending generally forwardly and inwardly from the first wing to the central frame in latched connection with the central frame and a released position extending generally upwardly from the first wing; and a second brace member coupled to the second wing for pivotal movement relative to the second wing about a second axis extending generally in the longitudinal direction of the second wing such that in the working position of the second wing the second brace member is pivotal between latched position extending generally forwardly and inwardly from the second wing to the central frame in latched connection with the central frame and a released position extending generally upwardly from the first wing.

Each brace member is preferably pivotally coupled to the front end of the respective wing at longitudinally spaced positions on the respective wing.

Each of the first and second axes is preferably oriented at a downward inclination from the inner end towards the outer end of the respective wing.

Each of the brace members is preferably pivotal with the respective wings between the transport position and the working position thereof in the released position of the brace members.

There may be provided a cradle member fixed on the central frame in association with each brace member and a connecting member on a forward end of each brace member. Preferably each connecting member is arranged to be slidably received through an open top end of the respective cradle member in the latched position so as to retain the wings in the working position as the central frame is displaced in the forward working direction.

Each connecting member may comprise a pivot shaft oriented in the forward working direction in the latched position. Preferably each pivot shaft is arranged to be received in the respective cradle member such that the brace member is pivotal about a respective pivot axis oriented generally in the forward working direction.

When the central frame supports a packer roller thereon for rolling movement in the forward working direction and each wing comprises a frame including a pair of frame members spanning in the longitudinal direction of the wing above a respective packer roller oriented for rolling movement in the forward working direction in the working position of the wings, each brace member is preferably pivotally coupled to the respective wing at an outermost end of the brace member at a location spaced below the frame members of the frame of the respective wing.

According to a further aspect of the present invention there is provided a ground levelling device for a land roller implement having a frame, a hitch member on the frame for connection to a towing vehicle and a packer roller rotatably supported on the frame about a horizontal roller axis for rolling movement along the ground in a forward working direction of the towing vehicle, the device comprising:

a levelling beam;

a beam suspension arranged to independently support the beam on the frame of the implement to span in a direction of the roller axis forwardly of the packer roller;

By supporting a levelling beam ahead of each roller in which the beam suspension independently supports the beam on the frame of the roller, a floating beam is provided which levels protruding mounds of soil ahead of the compaction of the roller while readily permitting the beam to be deflected relative to the roller when obstacles are encountered. By further providing a plurality of support rollers along the rear side of the beam, the beam can be supported for upward and rearward movement into rolling engagement with the main packing roller to provide additional support to the beam when obstacles are encountered. A longer and more lightweight beam can thus be used for levelling than prior art attempts while remaining well supported against damage from contacting obstacles due to the support rollers being arranged for rolling engagement with the main packing roller. By arranging the beam suspension to bias the beam and support rollers into a forward position ahead of the main packing roller, the support rollers are protected from excessive wear as the support rollers are not in rolling engagement during normal operation. Normal operation typically comprises low load operation where the beam is working light soil or the beam encounters few mounds or stones. The biasing of the spring is intended to be overcome so that the support rollers engage the packing roller under non-typical high load loading of the beam resulting from contact with an excessive number of hard packed mounds or large stones for example.

The beam suspension preferably supports the levelling beam for movement upward and rearward relative to roller.

The beam preferably spans a full width of the roller.

There may be provided a pair of ground wheels supported at opposing ends of beam so as to be arranged for rolling movement along the ground in the forward working direction.

Preferably there is provided a plurality of support rollers rotatably supported on beam at spaced positions along a rear side of the beam in which the support rollers are arranged to engage the packer roller to provide support to levelling beam.

Preferably a spring member is arranged to bias the levelling beam forwardly into a normal working position in which the support rollers are disengaged from the packer roller.

The levelling beam may further include an upper flange extending upwardly to a top edge in proximity to the roller so as to be arranged for scraping the roller.

The levelling beam may be used in combination with a seeding attachment comprising:

a seed supply arranged to be supported for movement along the ground in the forward working direction with the land roller implement; and a seed delivery mechanism arranged to be supported on the frame of the land roller implement forwardly of the packer roller and to direct seed from the seed supply between the levelling beam and the packer roller.

There may be provided a plurality of furrowing knives supported on the levelling beam at spaced apart positions in a direction of the roller axis to extend downwardly from the levelling beam for forming furrows in the ground.

The plurality of furrowing knives are preferably readily separable from the levelling beam.

Each furrowing knife may comprise an upright plate member oriented generally parallel to the forward working direction and extending downwardly at a lateral inclination.

The seed delivery mechanism preferably comprises a plurality of seed delivery tubes supported on the levelling beam.

According to a further aspect of the present invention there is provided a seeding attachment for a land roller implement having a frame, a hitch member on the frame for connection to a towing vehicle and a packer roller rotatably supported on the frame about a horizontal roller axis for rolling movement along the ground in a forward working direction of the towing vehicle, the seeding attachment comprising:

a seed supply arranged to be supported for movement along the ground in the forward working direction with the land roller implement; and a seed delivery mechanism arranged to be supported on the frame of the land roller implement and to direct seed from the seed supply rearwardly onto a front side of the packer roller.

The seed delivery mechanism preferably comprises a plurality of seed delivery tubes forwardly of the packer roller and having respective open ends facing rearwardly towards the packer roller which are lower in elevation than the roller axis and which are in close proximity to the front side of the packer roller. More particularly, the open ends are preferably positioned downwardly and rearwardly of a forwardmost portion of the packer roller.

When the seeding attachment is in combination with a land roller implement comprising a levelling beam arranged to be supported on the frame of the implement to span in a direction of the roller axis forwardly of the packer roller so as to be arranged for levelling engagement with the ground, the seed delivery mechanism is preferably arranged to direct the seed between the levelling beam and the packer roller.

According to another aspect of the present invention there is provided a conversion kit for use with a land roller implement wherein the land roller implement comprises a main frame, a hitch member on the main frame for connection to a towing vehicle, and a packer roller rotatably supported on the main frame about a horizontal roller axis for rolling movement along the ground in a forward working direction of the towing vehicle, the packer roller comprising a cylindrical roller surface surrounding a hollow interior spanning in a direction of the roller axis between opposing open ends, a plurality of spokes spanning radially outward from the roller axis to the cylindrical roller surface at each of the open ends of the packer roller, and a pivot shaft supported by the spokes at each of the open ends of the packer roller for rotatably supporting the packer roller on the main frame, the conversion kit comprising:

an end panel associated with each open end of the roller which is arranged to fully span and enclose the respective open end of the roller, each end panel comprising a plurality of separate panel members arranged to joined with one another to define the end panel in which each of the separate panel members is arranged to be fully inserted into the hollow interior of the cylindrical roller surface through an opening between adjacent ones of the spokes at the ends of the roller such that the end panel is arranged to enclose the respective open end of the roller at a location spaced inwardly in relation to the spokes.

Each end panel preferably comprises at least three separate panel members in which at least one panel member of each end panel comprises an access port therein with a mating cap member arranged to be mounted thereon.

Each end panel preferably comprises a pair of first panel members which are generally semi-circular in shape and which include a respective access port formed therein adjacent a peripheral edge of the panel member and at least one second panel member arranged to be mounted between the two first panel members such that the panel members fully span the respective open end of the roller.

According to another aspect of the present invention there is provided a cover crop roller device for a land roller implement having a frame, a hitch member on the frame for connection to a towing vehicle and a packer roller rotatably supported on the frame about a horizontal roller axis for rolling movement along the ground in a forward working direction of the towing vehicle, the cover crop roller device comprising:

a circumferential support comprising at least two sections arranged to be mounted circumferentially about the packer roller such that each section extends partway about a circumference of the packer roller;

a plurality of crop engaging members supported on each section of the circumferential support to extend radially outward from an outer surface of the packer roller;

the sections of the circumferential support being selectively separable from one another such that the circumferential support is readily separable from the packer roller.

By providing a cover crop rolling device having a circumferential support which is readily separable from the roller, a single roller is arranged for use either as a conventional land roller or with protrusions thereon so that the roller can be used for crimping a cover crop.

The sections of the circumferential support are preferably arranged to be secured to the packer roller using threaded fasteners.

The circumferential support may comprise a plurality of annular bands extending about a circumference of the roller in which each section of the circumferential support comprises a portion of each band.

The annular bands are preferably spaced apart in an axial direction and the crop engaging members preferably extend in the axial direction so as to be connected between the annular bands.

The crop engaging members are preferably arranged to span across a full width of the roller in an axial direction of the roller at circumferentially spaced positions about the roller.

Various embodiments of the invention will now be described in conjunction with the accompanying drawings in which:

BRIEF DESCRIPTION OF THE DRAWINGS

FIG. 1 is a top plan view of a land roller implement in a transport position.

FIG. 2 is a top plan view of the implement in a field working position.

In the drawings like characters of reference indicate corresponding parts in the different figures.

DETAILED DESCRIPTION

Figure 3:
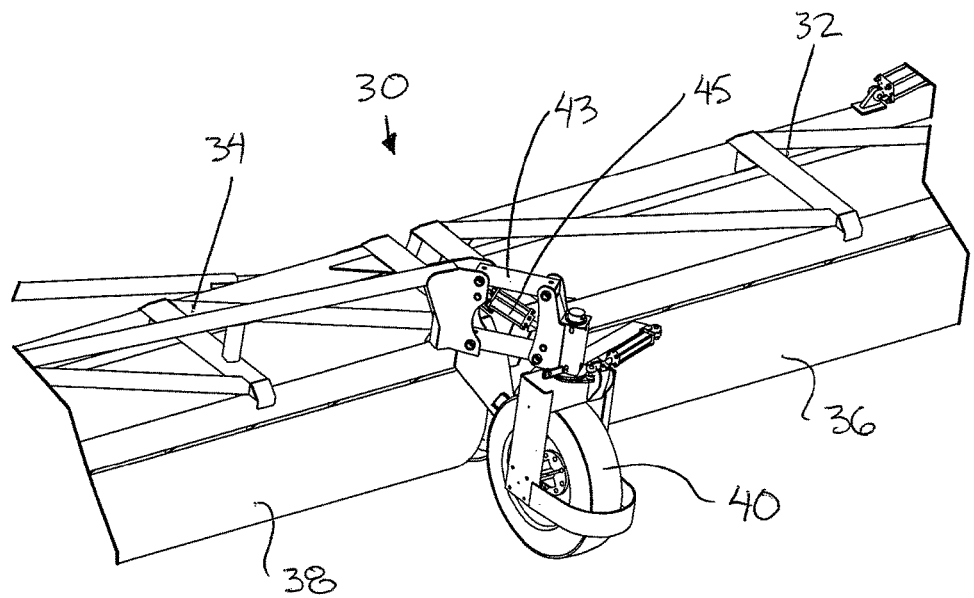
FIG. 3 is a perspective view of the packer wheel in a working position.

Referring to the accompanying figures there is illustrated a land roller implement generally indicated by reference numeral 10. The implement 10 is particularly suited for use with a towing vehicle, for example a tractor 12 for rolling movement across the ground in a forward working direction 14 of the tractor.

The implement 10 comprises a central frame portion 16 which is elongate in a lateral direction perpendicular to the forward working direction. The central frame includes front and rear beams 18 spanning the width of the frame and interconnected by suitable crossbars.

A hitch member 20 is coupled to the front of the central frame portion 16. The hitch member generally comprises two arms 22 which are hinged at rear ends on the front beam of the central frame portion and which extend forwardly and inwardly to be joined at a front end locating a suitable coupling 24 for connection to the towing vehicle.

The central frame portion 16 supports a central roller 26 thereon below the beams of the central frame portion such that the roller 26 spans the full width of the frame. The roller is generally cylindrical in shape and is supported for rotation about a horizontal axis extending in the lateral direction for rolling movement along the ground in the forward working direction. Transport wheels 28 are coupled to the rear of the central frame portion and include a suitable mechanism to permit the transport wheels 28 to be lowered for engagement into the ground to in turn raise the roller 26 off of the ground for transport. Under normal use in a field, the transport wheels 28 are lifted so that the weight of the frame is carried on the central roller 26.

The implement 10 further comprises first and second wings 30 which are each elongate in a longitudinal direction from an inner end coupled to the central frame to a free outer end. Each of the first and second wings comprises an inner frame 32 and an outer frame 34 connected in series with one another in the longitudinal direction of the wing. Accordingly an inner end of the inner frame 32 is pivotally coupled onto the central frame portion 16 and the inner end of the outer frame 34 is coupled to the outer end of the inner frame. The inner and outer frames of each wing are coupled to one another for articulating movement about a horizontal axis oriented perpendicularly to the longitudinal direction of the wing so as to be aligned in the forward working direction in the working position of the wings. Each of the inner and outer frames comprises front and rear beams interconnected by crossbars.

The inner frame 32 comprises an inner roller 36 supported below the inner frame for rotation about a longitudinal axis extending in the longitudinal direction of the wing. The outer frame similarly comprises an outer roller 38 which is supported for rotation about a longitudinal axis extending in the longitudinal direction of the wing. Both the inner and outer rollers span the full width of the respective frame below which they are mounted. The mounting of the inner and outer frames in series with one another results in the inner and outer rollers being aligned with one another for rotation about a generally common axis with a gap being provided between the inner and outer rollers of each wing.

The first and second wings 30 are pivotally supported at the inner ends at the rear side of the central frame portion adjacent laterally opposed ends thereof respectively. Each of the wings is supported for pivotal movement about an upright axis from a transport position to a field working position. In the working position, the wings extend laterally outward in opposing direction to span generally perpendicularly to the forward working direction of the implement. In the transport position, the wings each extend rearward from the central frame portion so as to be generally parallel to one another and to the forward working direction. In the working position the rollers are arranged for rolling movement in the forward working direction.

Each of the wings includes a packer wheel 40 rotatably supported on the axle of a wheel support frame coupled to the outer end of the inner frame. The axle is moveable with the wheel support frame for pivotal movement about an upright axis between a working position of the wheel 40 in which the axle is parallel to the longitudinal direction of the wing and a transport position in which the axle is perpendicular to the longitudinal direction. Accordingly the packer wheel is suited for rotation in the forward working direction of the implement in either one of the working or transport positions. The wheel comprises a solid tire having a generally cylindrical outer surface so as to be suited for packing in the working position while also being effective for rolling movement as a transport wheel in the transport position.

The support frame of the axle is also adjustable in height so that the packer wheel 40 can be lowered relative to the rollers in the transport position which in turn lifts the rollers off of the ground for transport. The packer wheels can also be raised to the height of the rollers to provide a packing pressure on the ground substantially equal to the packing pressure of the rollers in the working position. The height of the support frame of the packer wheel is hydraulically controlled by a height control actuator coupled between the support frame of the wheel and the roller frame of the respective wing for controlling the packing pressure of the packing wheel 40 in the working position. In the working position the wheel is aligned with the gap between the rollers while providing some overlap with both of the inner and outer rollers in the longitudinal direction of the wings which corresponds to the lateral direction of the implement in the working position. The orientation of the wheel 40 between the transport and working positions thereof is also hydraulically controlled by a separate steering actuator for hydraulically steering the packing wheel 40 on each wing.

In the transport position, the packing wheels 40 support the outer ends of the inner frame for rolling movement along the ground with the roller spaced upwardly from the ground. The outer frame is in turn supported for trailing movement on the inner frame for relative articulating movement about the horizontal axis oriented perpendicularly to the longitudinal direction of the wing as described above.

In larger land rollers with multiple sections of rollers, for example 2 or more, along each wing, a packer wheel 40 may be provided in alignment with the gap between each adjacent pair of rollers in which the packer wheel is similarly arranged to be pivoted into a transport position for dual use in both packing during the working position and supporting the wings for rolling movement along the ground in the transport position. Wheels aligned with gaps between the outermost ones of the rollers would be hydraulically steerable and locked in the transport position, while the wheels at the gaps between the innermost ones of the rollers would be free to caster through a limited range of movement in the transport and working positions.

The land roller implement further comprises an auxiliary transport wheel 50 supported at the outer end of the outer frame of each wing 30. The auxiliary transport wheel 50 similarly comprises a wheel support frame 52 supported on the outer end of the outer frame. The wheel support frame 52 is pivotal relative to the outer frame of the wing about a horizontal axis which is perpendicular to the longitudinal direction of the wing. A suitable hydraulic control is coupled between the wheel support frame 52 and the outer frame of the wing for controllably lifting and lowering a free end of the wheel support frame 52.

A wheel axle is supported on the free end of the wheel support frame 52 for rotatably supporting the transport wheel 50 thereon. The wheel 50 is rotatable about the axis of the wheel axle in which the wheel axle and wheel are pivotal together about an upright axis relative to the wheel support frame between a working position in which the axle is perpendicular to the longitudinal direction of the wing and a transport position in which the wheel axle is parallel to the longitudinal direction of the wing. In the working position of the transport wheel 50, the wheel is supported for rolling movement in a forward direction in the working position of the wing. Alternatively in the transport position, the transport wheel 50 is supported for rolling movement in the forward working direction when the wing is in the transport position.

The transport wheel 50 is arranged to be pivoted at a rear end outwardly and forwardly from the transport position to the working position when the wings are in the transport position. In this transport position, the wheel support frame 52 is lowered relative to the frame of the roller so that the roller is lifted off of the ground and supported for rolling movement on the transport wheel. Pivoting the axle into the working position of the transport wheel and then driving forward rotation of the transport wheel causes the respective wing to be displaced forwardly from the transport position towards the working position. Once in the working position of the wing shown in FIG. 5, the transport wheel 50 is lifted off of the ground by raising the wheel support frame 52 so that weight of the wing is then carried on the roller in the field working position.

In the embodiments of FIGS. 1 through 6, the transport wheel 50 at the outer end of each wing comprises a drive wheel which is driven for forward rotation by a suitable wing drive 54 which drives the forward rotation of the transport wheel in the working position of the transport wheel to deploy the wing from the transport position to the working position. The wing drive includes a drive motor 56 in the form of a hydraulic orbit motor supported on the wheel support frame 52 for movement therewith relative to the outer frame. The drive motor 56 includes a rotary output supporting an output drive roller 58 thereon which is rotatable about a horizontal axis parallel to the longitudinal direction of the wing and parallel to the wheel axle when the wheel is in the working position. The output drive roller 58 is positioned to engage the outer periphery of the transport wheel 50 at the front side thereof so that rotation of the output drive roller 58 by the drive motor 56 causes rolling engagement with the transport wheel to drive rotation of the wheel forward. Pivoting the wheel from the working position to the transport position results in the wheel becoming disengaged with the output drive roller 58 of the drive motor due to the rearward and inward displacement of the wheel from the working position to the transport position. The automatic disengagement of the transport wheel with the wing drive results in the transport wheel being free rolling in the transport position.

Figure 5:
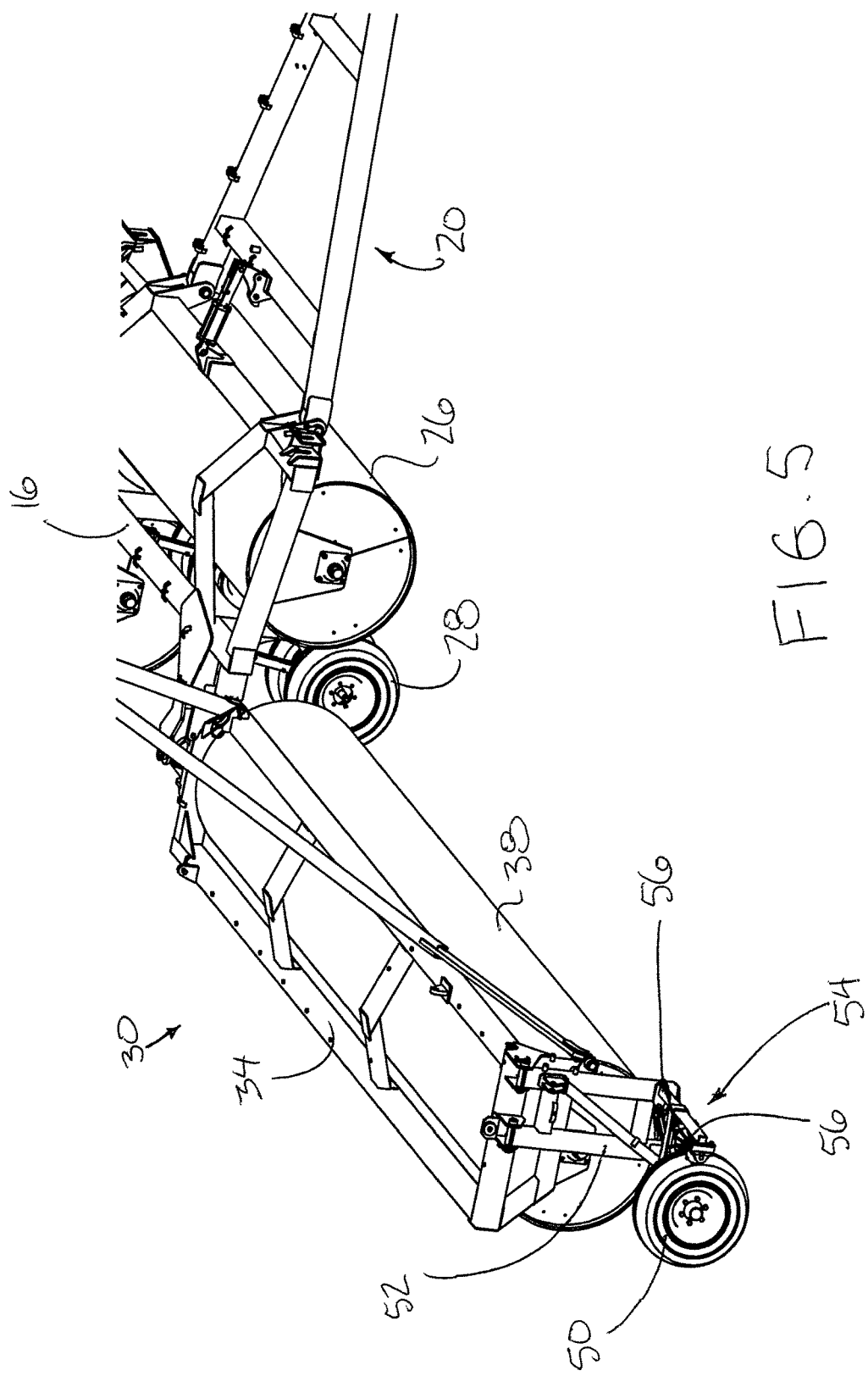
FIG. 5 is a perspective view of the transport wheel at the end of the wings in the working position of the wings prior to the wheel being lifted out of contact with the ground.

When the wings comprise a single roller as shown in FIG. 5, the transport wheel 50 may be generally centered and aligned with the longitudinal axis of the roller in the transport position so that wings are balanced in the transport position. When employing multiple roller sections as shown in FIG. 1 in which packer wheels 40 are provided along the inner sides of the wings in the transport position, the transport wheels at the outer ends of the wings may be offset towards the outer side of the wings in the transport position which corresponds to the wheels being offset towards the front side of the wings in the working position.

Figure 4:
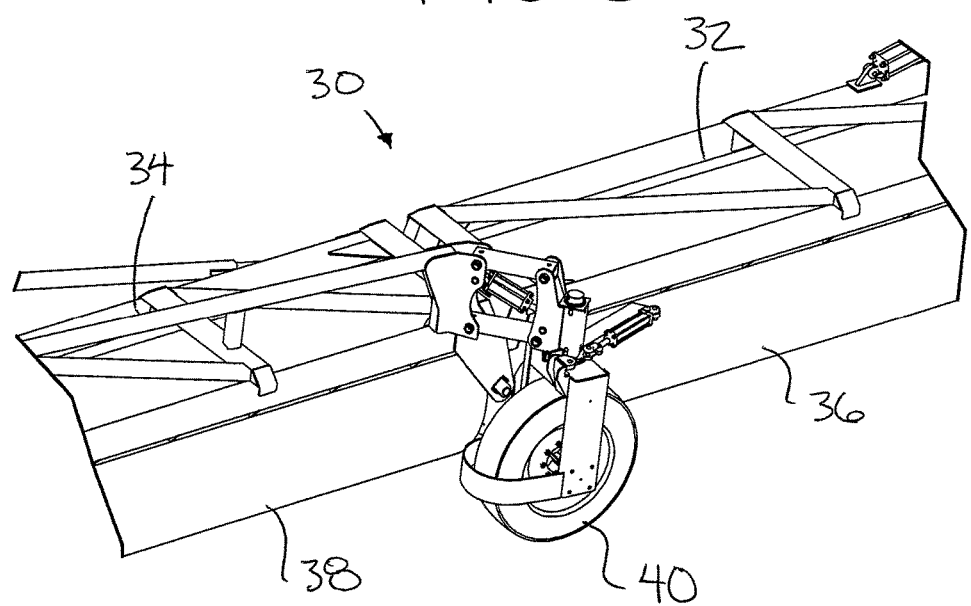
FIG. 4 is a perspective view of the packer wheel in a transport position.

As described above, FIG. 3 shows a large black tire packing the gap between 2 land rollers—in the field working position. Accordingly a normal transport wheel is turned 90 degrees from the transport position to do the field operation of packing, in this case packing the gap between two 42" diameter barrels. The wheel will be a bit wider than the gap to give overlap packing and the tire would preferably be a hard tire to push stone into the ground and pack seeds into the soil. FIG. 4 shows the wheel turned 90 degrees to allow the unit to be towed down the road. In the field position, rolling with the barrels—the wheel as a packer will have a control for pressure, and jump over larger obstacles, for example stumps while still having the ability to push some smaller obstacles such as stones into the ground.

Figure 6:
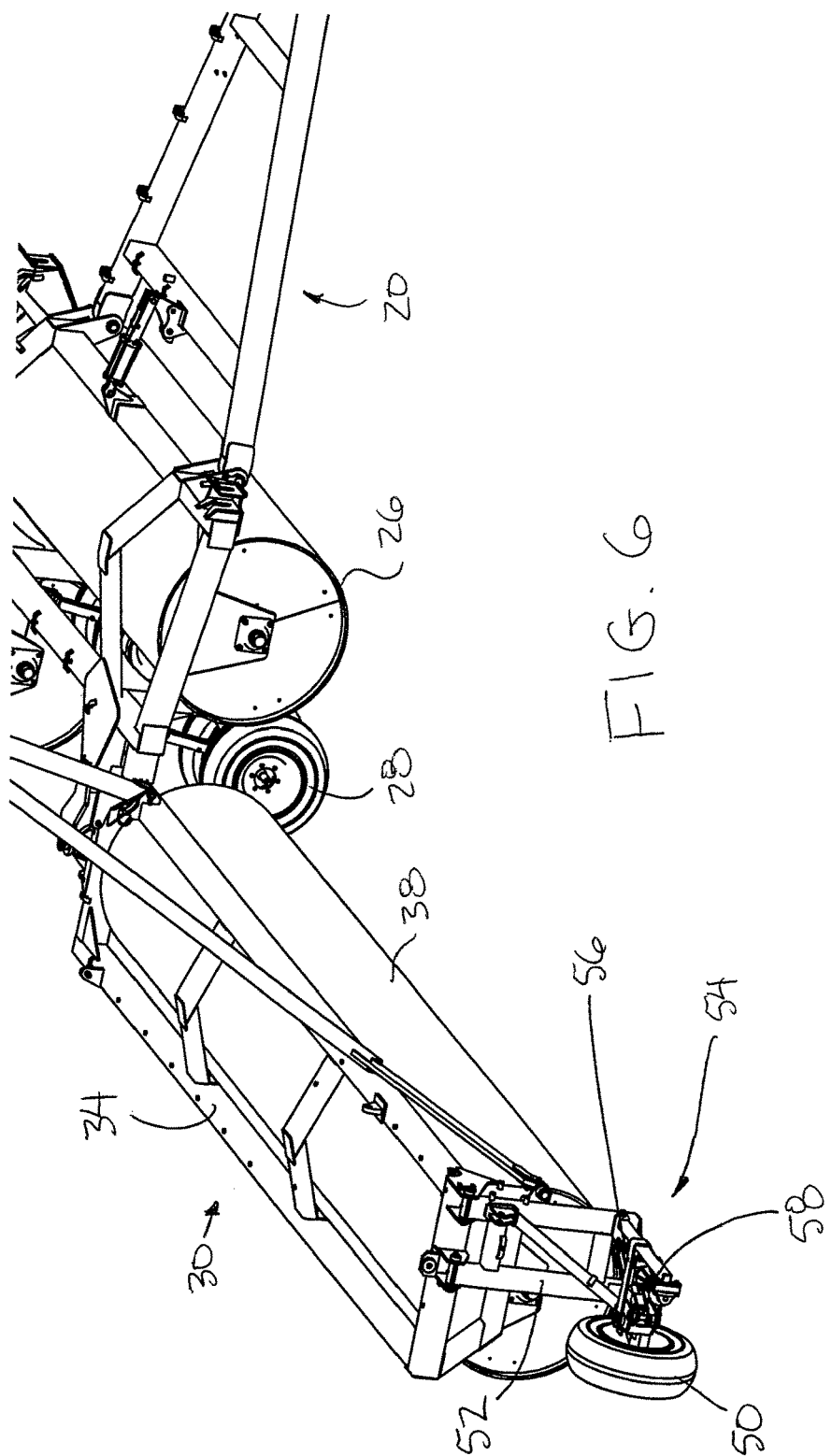
FIG. 6 is a perspective view of the transport wheel in the transport position.

Also as described herein, FIG. 5 shows the outer wheel in position against the hydraulic motor driven roller—in this case to have just driven the wing forward to field working position. FIG. 6 shows the wheel in position to trail the wing end ways down the road. The black rubber tire no longer is in contact with the orange hydraulic drive assembly so no clutch is required on the motor drive as the disconnect occurs when the wheel is rotated. The hydraulics are set up to have the cylinder turn the wheel, then the motor is started, and the wing swings to field operation position. The wheel is raised to leave all weight on the barrel to do the packing. To go to road position, lower the wheel and drive away forward. The benefit of having the wing fold out without backing up is to allow the packer to be pulled behind an air seeder complex that cannot be backed up straight to allow rollers to get into the field position. There is also the issue of time as backing up and stopping and turning to get into field position uses up a lot of valuable seeding time. The wings are expected to move into field position in 15-30 seconds.

Figure 11:
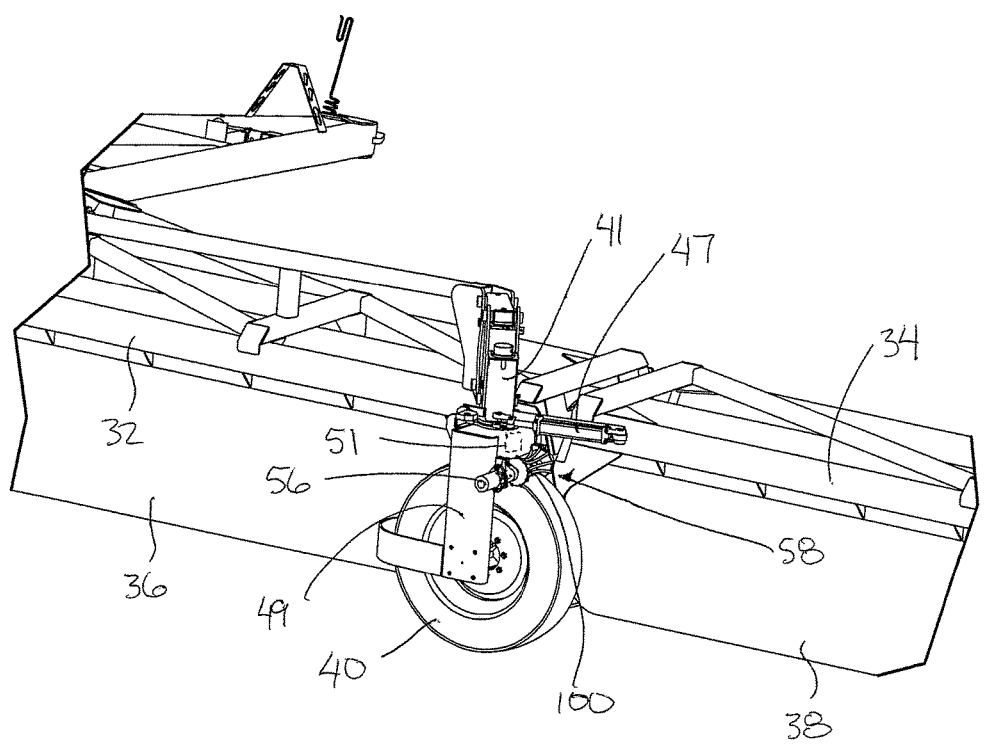
FIG. 11 is a perspective view of an alternative configuration of the packer wheel which also functions as a drive wheel.

Turning now to FIG. 11, a further embodiment of the packer wheel 40 in which the packer wheel which is in alignment with the gap between two rollers of each wing includes the wing drive 54 associated therewith as opposed to the wing drive being associated with the auxiliary transport wheels 50 at the outer ends of the wings. The auxiliary transport wheels 50 in this instance may be free castoring wheels during displacement between transport and working positions of the wings or alternatively the wheels 50 at the outer ends of the wings may be hydraulically steered similarly to the packer wheel 40.

In this instance the packer wheel is similarly supported on a respective wheel axle which is hydraulically steered between transport and working positions about a vertical axis in relation to a wheel support frame 41 which is in turn coupled to the frame of the wing so as to be adjustable in height in relation thereto by a parallel bar linkage 43. A height control actuator 45 is coupled between the wheel support frame 41 and the frame of the wing for controlling the height of the drive wheel 40 according to the operating condition of the land roller.

More particularly, the height control actuator lowers the packer wheel below the respective rollers of the wing in the transport position such that the rollers are suspended spaced above the ground for transport. In the working position, the height control actuator functions to level the bottom of the packer wheel with the bottom of the roller so as to apply a substantially even packing pressure to both the packer wheel and the rollers in the working position. A hydraulic steering actuator 47 is coupled between the support frame 41 and the frame carrying the wheel axle for pivotally steering the orientation of the wheel axle about the vertical pivot axis of the wheel axle relative to the wheel support frame 41.

Similarly to the previous embodiment forward motion of the drive wheel is driven by a drive motor 56 which drives rotation of an output drive roller 58 which is arranged to engage the periphery of the wheel to drive forward rotation of the wheel from the transport position to the working position of the wings.

Each drive roller 58 is supported for vertical movement relative to the wheel axle frame 49 to displace the drive roller 58 into and out of engagement with the wheel on the wheel axle. A wheel pressure actuator 51 is coupled between the wheel axle frame and the frame supporting the drive roller 58 thereon to apply a constant contact pressure of the roller against the wheel in operation.

The output drive roller 58 comprises an open frame in the form of a plurality of traction members 100 which span the full width of the roller in the axial direction between opposing ends of the output drive roller which corresponds approximately to the full width of the tire in the axial direction thereof. The traction members are evenly circumferentially spaced about the axis of rotation of the roller such that the traction members surround a hollow interior of the roller and provide openings between each adjacent pair of traction members. This ensures positive contact of the traction members with the periphery of the packer wheel as any debris collected on the wheel readily passes through the open frame of the roller. Each of the traction members comprises a concave outer surface which mates with the convex profile of the tread about the periphery of the drive wheel.

The various actuators including the steering actuator 47, the wheel pressure actuator 51, and the hydraulic orbit motor which defines the drive motor 56 may be all interconnected by hydraulic sequencing valves such that a single controller actuation is required to actuate initially displacing the drive wheel into the working position followed by lowering of the drive roller 58 into contact with the packer wheel, and subsequently followed by forward driving rotation of the drive roller 58 to drive the wings forward into the working position thereof. Similarly the various hydraulic controls may be coupled by sequencing valves so that the reverse operation can be performed with a single controller actuation to disengage the drive motor and return the drive wheels and wings to the transport position.

On the outer wheel of a 3 section roller, the hydraulic circuit has been proven to operate very well. A single actuation lever is pulled to fold the wings of the implement with the wheel turning 90 degrees as activated by the cylinder. After the wheel turns and engages the drive roller, an adjustable sequence valve maintains the desired pressure against the drive roller, and oil is directed to the hydraulic motor to begin the fold motion. The operator simply holds the lever in one direction so that a single hydraulic lever is required to do the deployment of the wings to the working position. Moving the lever in the other direction causes the wheel to disengage the drive roller all on one control.

As described above with regard to FIG. 11, the center packing and transport wheel has a drive roller attached to it. The single actuating lever uses the same cylinder motion first, drive roller motion second, while maintaining the preset and adjustable pressure of the drive roller against the wheel. In this instance, the tire/wheel is not rotated to contact the drive roller, but rather the drive roller is hydraulically swung on a pivot to contact the rubber tire, and the hydraulic motor then begins to turn, again on one lever actuation.

Figure 12:
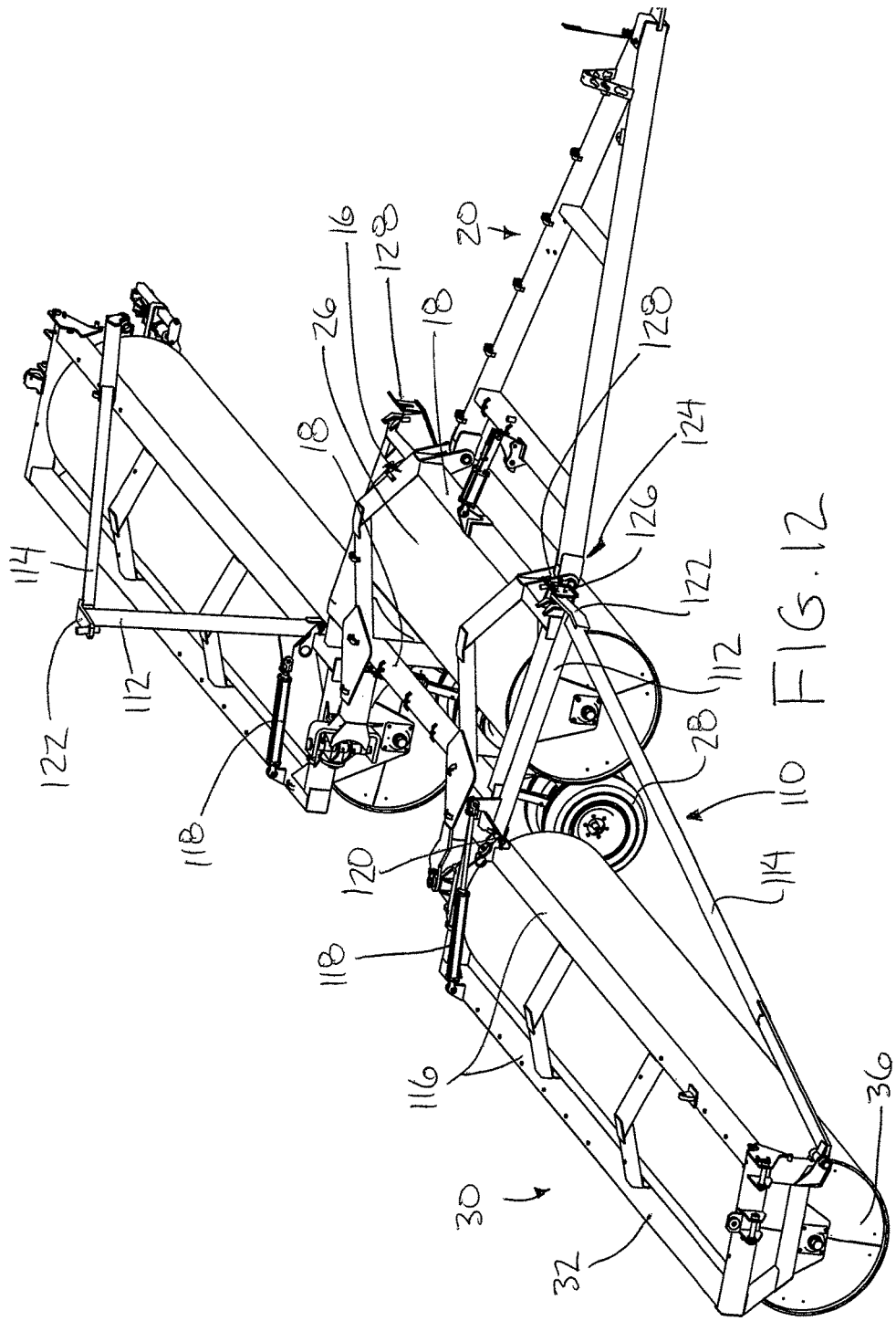
FIG. 12 is a perspective view of a brace member for one of the wings in the latched position.
Figure 13:
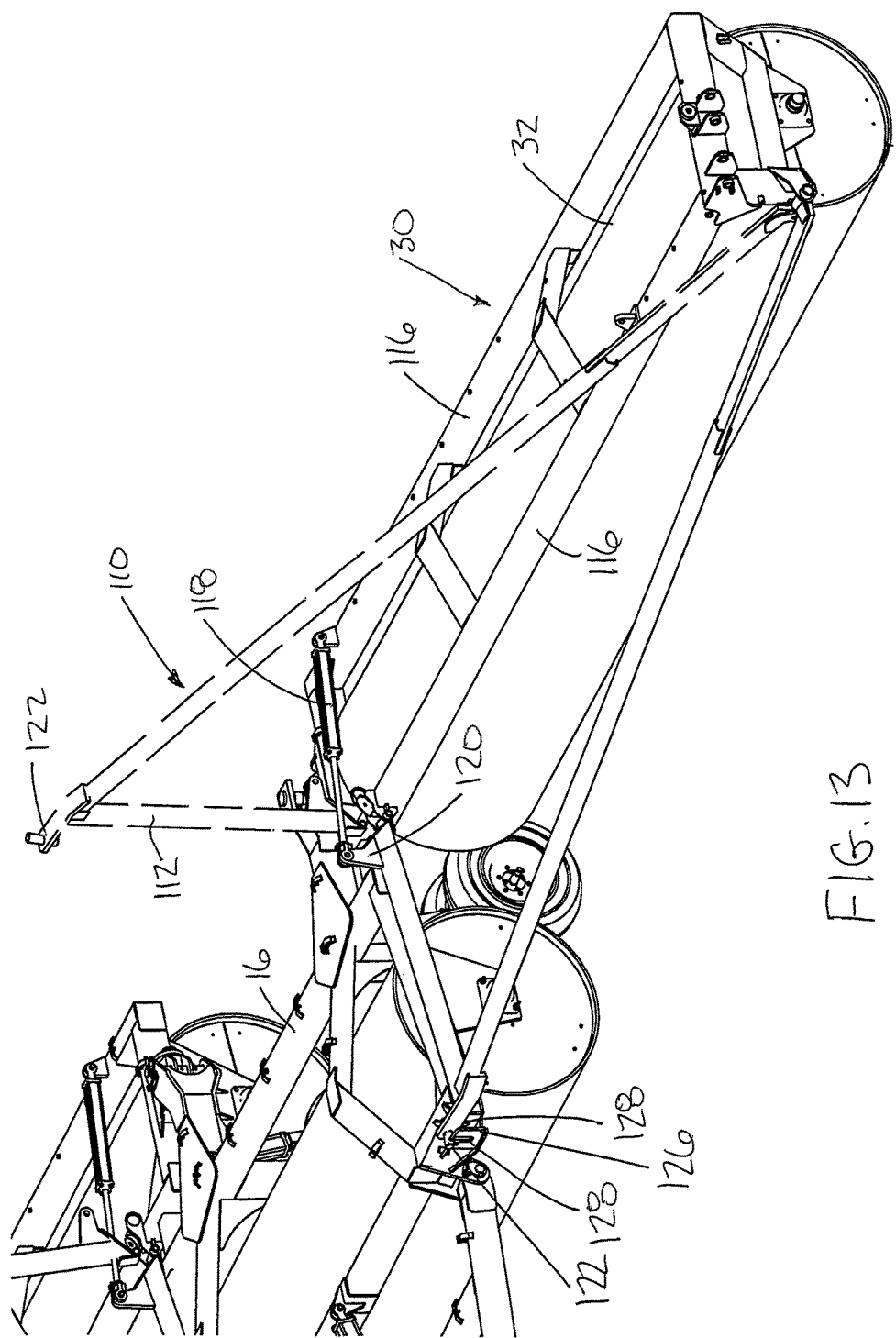
FIG. 13 is another perspective view of the brace member according to FIG. 12 shown in both the latched and released positions.
Figure 14:
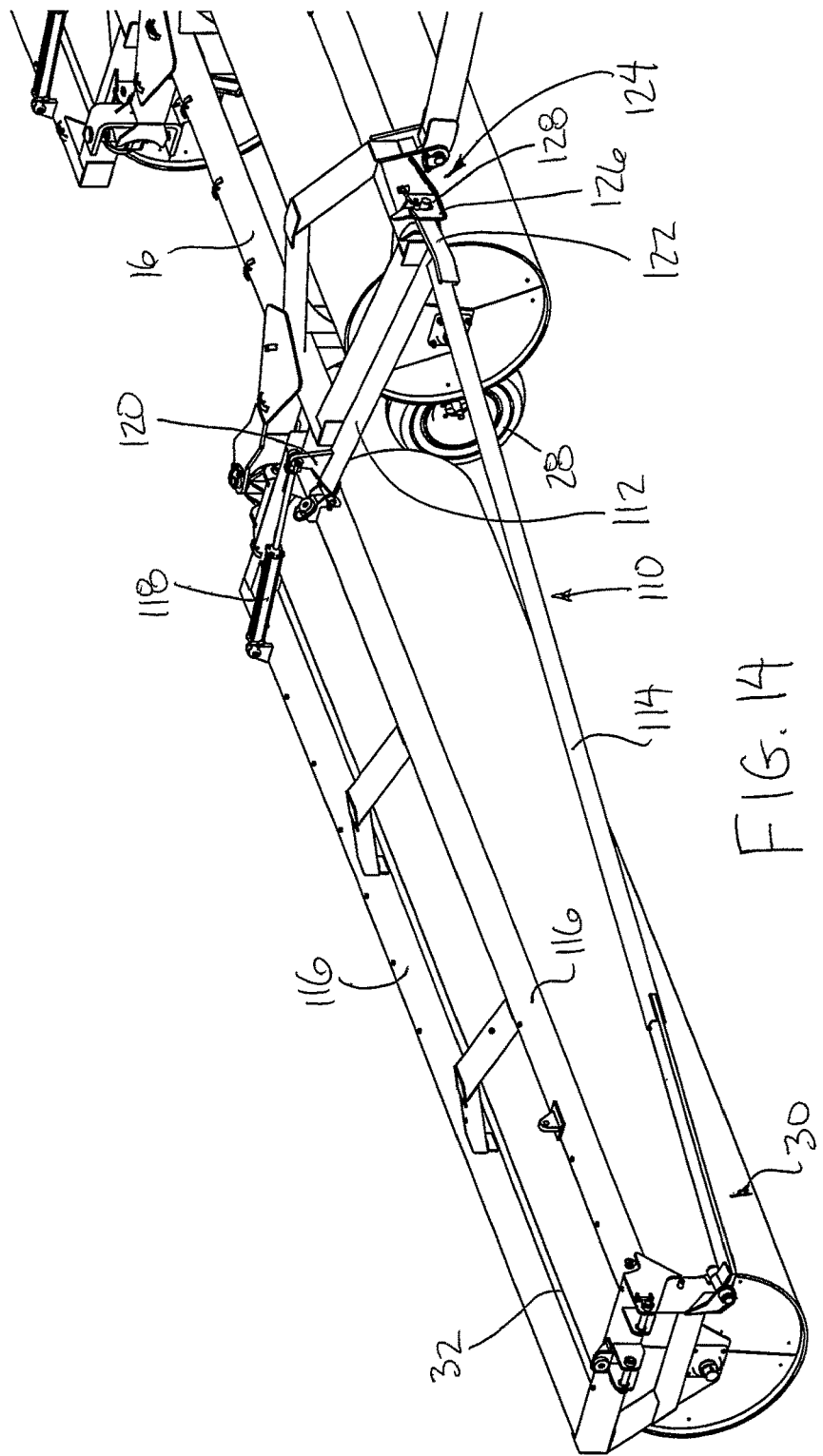
FIG. 14 is a perspective view of a further embodiment of the brace member.

Turning now to FIGS. 12 through 14, first and second brace members 110 are shown for selectively latching the first and second wings respectively in their working positions. The first and second brace members are coupled to the respective first and second wings for pivotal movement in relation thereto about a respective first or second axis extending generally in the longitudinal direction of the wing. Accordingly each of the brace members is pivotal in a working position of the respective wing between a latched position in which the brace member extends generally forwardly and inwardly from the wing to the central frame portion 16 of the implement in latched connection with the central frame and a released position extending generally upwardly from the wing so as to be moveable with the wing between the working and released positions of the wings. In the latched position the brace members serve to retain the respective wings in the working position relative to the central frame as the central frame is displaced in the forward working direction.

Each brace member 110 comprises an inner frame member 112 and an outer frame member 114 pivotally coupled at respective rear ends at longitudinally spaced positions along the front side of the wings. More particularly when the wing comprises an inner frame 32 and an outer frame 34 as described above with the inner frame comprising front and rear frame members 116 spanning the full length in the longitudinal direction of the inner frame, the inner and outer frame members are pivotally coupled at respective inner and outer ends of the front frame member.

The inner frame member 112 extends generally forwardly in the working direction and the outer frame member 114 extends forwardly and inwardly to join the inner frame member at respective front ends thereof. The frame members are fixed together at the front ends for pivotal movement together about a common pivot axis relative to the respective wing in which the pivot axis extends generally in the longitudinal direction of the wing at a downward incline from the inner end towards the outer end of the wing.

In this instance, the outer most portion of the brace member is pivotally coupled to the wing at a location which is lower in elevation than the inner end and which is spaced below the front and rear frame members of the wing frame so as to be nearer in elevation to the roller axis. Thus, forward towing forces transferred from the central frame to the brace member to the wings serve to tow the wings forwardly from a location nearer to the vertical centre of gravity thereof than pulling from the front and rear frame members of the wing frame at the top of the wings.

The brace members are each pivoted between the latched and released positions thereof by a suitable hydraulic actuator 118 coupled between the rear frame member 116 of the wing frame and a corresponding lug 120 on the inner frame member 112 of the brace member. The lug extends generally upwardly from the inner frame member adjacent the pivotal coupling thereof to the wing frame when the brace member is in the latched position. Contracting the hydraulic actuator 118 in this instance causes the lug 120 to apply a rotational force to the brace member to pivot the brace member upwardly into the released position.

Connection between the brace member and the central frame in the latched position is provided by a connecting member 122 at the forward end of the brace member which is arranged to be latched into a cradle member 124 on the central frame. The two cradle members 124 associated with the two wings respectively are fixed at opposing ends of the central frame adjacent the front side thereof. Each cradle member 124 includes an open top end arranged to slidably receive the connecting member 122 vertically therein. The cradle member 124 comprises two side members 126 with a vertical opening therebetween which receives the connection of the connecting member 122 to the brace member therethrough in the latched position. The connecting member 122 generally comprises a pivot shaft oriented in the forward working direction in the latched position of the bracing members with the pivot shaft being positioned to extend outwardly from opposing front and rear sides of the forward most portion of the brace member received in the cradle member. Each of the opposed ends of the pivot shafts are arranged to be slidably received within respective vertical slots 128 formed in the two side members 126 of the cradle member. Each of the slots 128 is vertical and open through the top end of the cradle member to slidably receive the respective ends of the pivot shafts down therein as the brace member is lowered into the latched position. Once the connecting member 122 is matingly received within the respective cradle member for each brace member, the brace members are retained in the latched position while remaining pivotal relative to the central frame about a pivot axis defined by the pivot shaft which extends in the forward working direction.

The diagonal pulling arms used in the industry by all competitors is a horizontal bar racking for transport along the outside of the rear folded frames. This creates a 6" or more additional transport width on each side of the machine. The brace system described herein uses a vertical racking design to have a maximum of 2.5" of additional transport width on each side. The design lends itself to pulling from a location at the outer end that is in the correct lower position closer to where the source of the rearward pulling forces from the bottom of the roller barrel itself. The brace can be of heavy design useful for rollers equipped with the land levelling blades or the very wide roller requested by some growers.

The system uses a stopper to position the wing that is often swung out by drive wheels as described herein, and then the arm is swung into place by a hydraulic cylinder. The hydraulic actuators which control operation of the brace members between latched and released positions can also be connected to operation of the wing drives 54 using sequencing valves as described above for both deploying and latching the wings with a single lever actuation.

Figure 19:
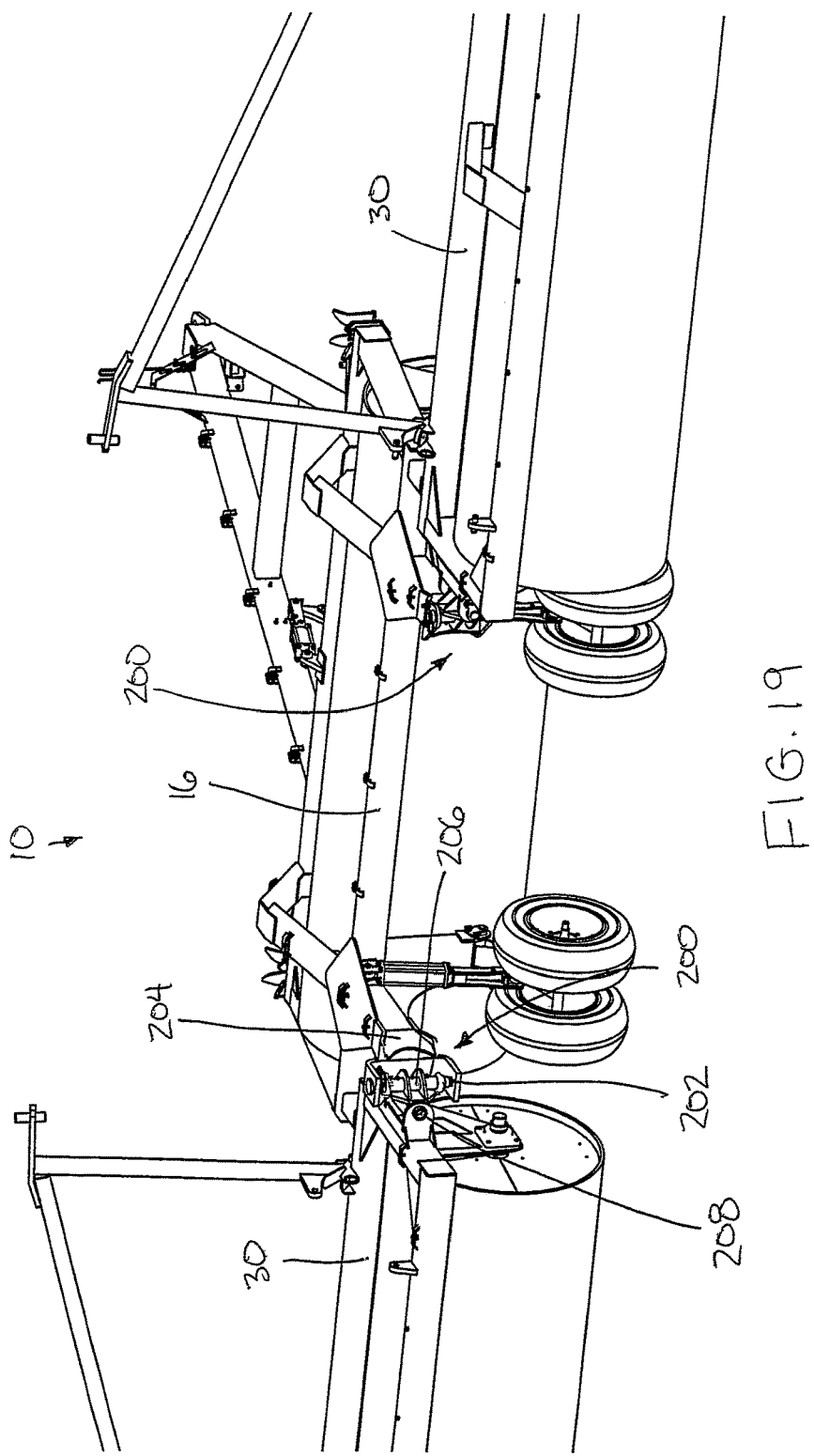
FIG. 19 is a perspective view of a further embodiment of a hinge coupling the wings to the central frame portion of the land roller implement.

Turning now to FIG. 19, a preferred embodiment of the pivotal connection between the first and second wings 30 and the central frame 16 of the main frame of the implement 10 will now be described in further detail. Each of the inner ends of the wings is coupled to the central frame by a respective pivot assembly 200. The pivot assemblies 200 allow for pivotal movement of the wings about their respective upright axes between the transport and working positions, while also allowing relative pivotal movement between the wings and the central frame about respective horizontal axes oriented in the forward working direction in the working position of the wings. The pivot assemblies 200 also allow for some vertical sliding movement of the wings relative to the central frame along the respective upright axes.

Each pivot assembly 200 comprises an upright pivot shaft 202 supported on the central frame at the rear trailing end a respective mounting arm 204 extending rearwardly in relation to the roller on the central frame 16. Each upright pivot shaft remains fixed relative to the central frame 16 and serves to define the respective upright axis of pivotal movement of the respective wing between the working and transport positions thereof.

Each pivot assembly 200 further comprises a knuckle member 206 coupled to the upright pivot shaft so as to be arranged for pivotal movement about the pivot shaft and the upright axis thereof relative to the central frame. The knuckle member 206 is shorter than the pivot shaft such that the knuckle member is also arranged for vertical sliding movement along the vertical pivot shaft and the upright axis thereof relative to the central frame.

The knuckle member 206 supports the inner end of the respective wing thereon such that the wing is movable with the knuckle member for pivotal movement about the upright pivot shaft 202 and for sliding movement along the upright pivot shaft 202 relative to the central frame. More particularly, the knuckle member supports a horizontal pivot shaft 208 thereon such that the horizontal pivot shaft 208 is movable therewith relative to the central frame. The inner end of the respective wing 30 is then coupled to the horizontal pivot shaft 208 so as to be arranged for pivotal movement relative to the knuckle member about a horizontal axis of the horizontal pivot shaft 208 and so as to be arranged for movement with the horizontal pivot shaft relative to the central frame. The horizontal pivot shaft 208 remains substantially perpendicular to the longitudinal direction of the respective wing 30 so as to oriented substantially parallel to the forward working direction in the working position of the wings.

The vertical movement between the inner ends of the wings and the central frame allows rollers on the wings to be supported at a different elevations than one another and the roller on the central frame while the rollers remain substantially parallel to one another. Accordingly when the roller on one of the wings rolls over ground at higher or lower elevation than the ground over which the center roller passes, the wing is permitted to operate at a corresponding higher or lower elevation than the central frame without forcing the lateral inclination of the wing or the central frame to vary. The additional degree of freedom between the wings and the central frame allows the land roller implement to better follow contours of the ground than many prior art implements.

Figure 7:
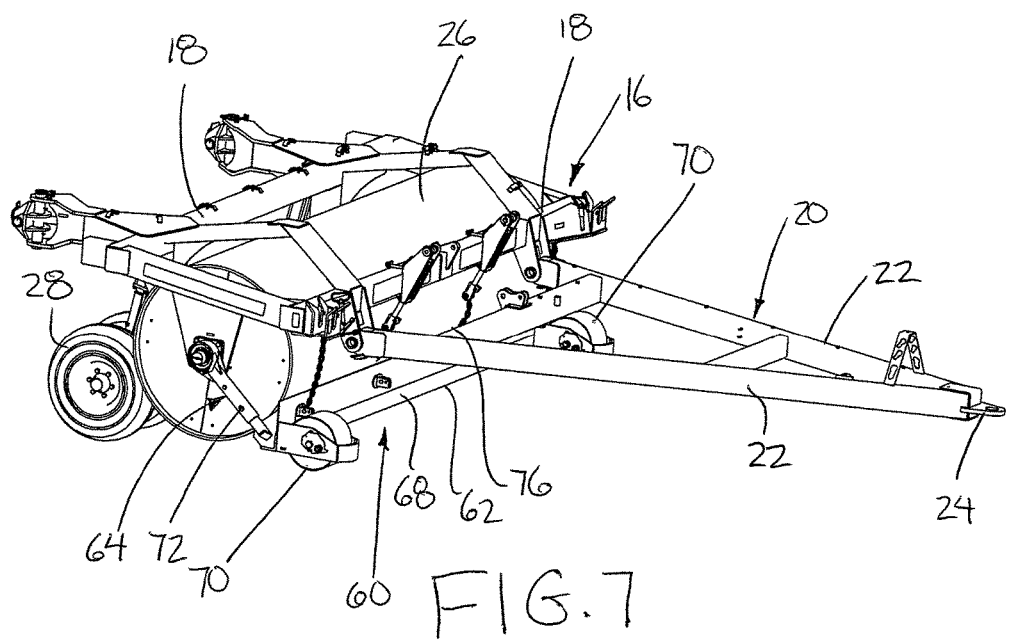
FIG. 7 is a perspective view of the levelling device shown supported on the central section of the land roller.
Figure 8A:
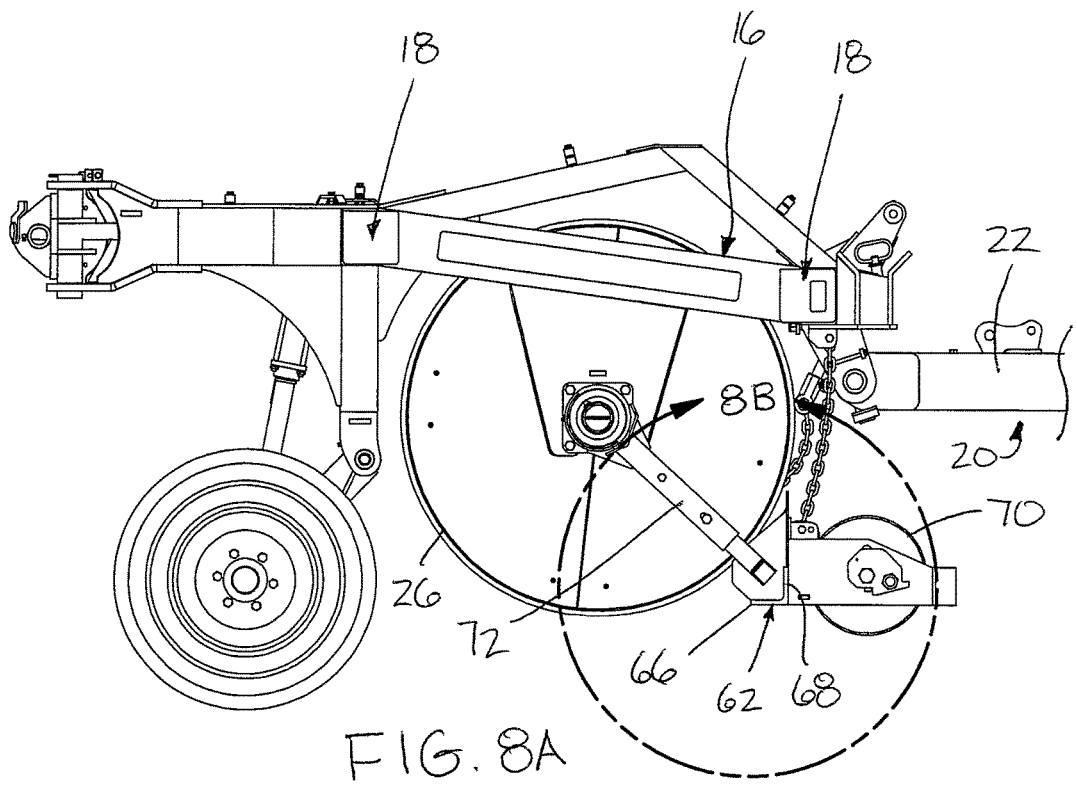
FIG. 8A is a side elevational view the levelling device of FIG. 7.
Figure 8B:
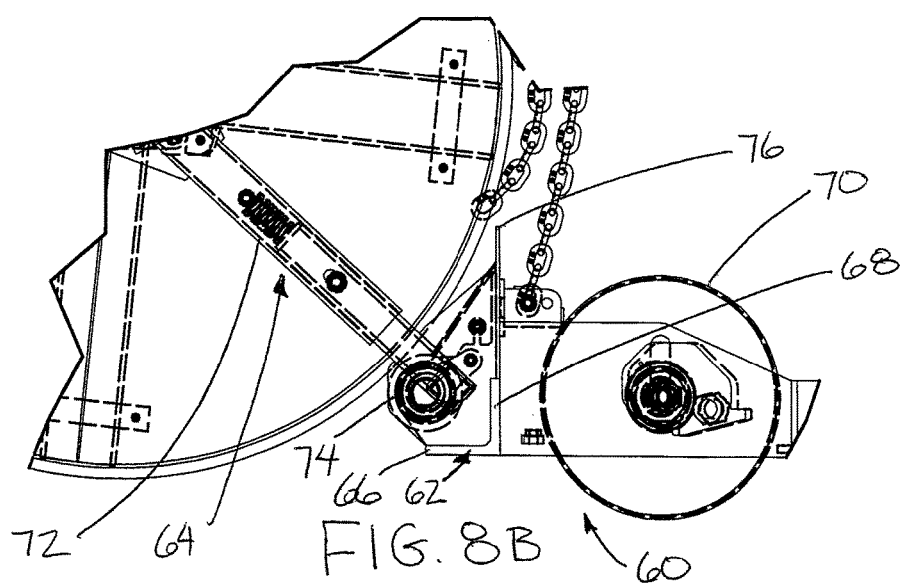
FIG. 8B is a partly sectional view of the referenced portion of FIG. 8A.

Turning now more particularly to FIGS. 7 and 8, a ground levelling device 60 is shown for optional use on the land roller of FIGS. 1 through 6, the levelling device 60 is typically provided in association with each one of the rollers of the land roller implement. Each device 60 comprises a levelling beam 62 associated with the roller to span substantially the full length of the roller in the longitudinal direction thereof. The levelling beam 62 is suspended in front of the roller by beam suspension 64 so that the beam is suspended from the frame of the roller for independent movement relative to the roller. The beam suspension 64 is anchored to the frame of the roller at the axis of the roller at opposing ends thereof so that the beam is moveable together with the beam suspension about the axis of the roller. The beam suspension 64 also supports the levelling beam 62 for upward and rearward deflection towards the roller when obstacles are encountered.

The beam 62 generally comprises an angle iron having a lower flange 66 which is supported to be generally horizontal in orientation across the width of the roller and an upper flange 68 extending generally vertically upward from a forward edge of the lower flange 66. The beam is carried on suitable skid shoes at opposing ends to support the beam adjacent to but spaced slightly above the ground. End wheels 70 are rotatably supported at opposing ends of the beam for rolling engagement along the ground in the forward working direction. The end wheels 70 are coupled to the beam so that the beam moves up and down with the contours of the ground together with the wheels relative to the roller and roller frame. The beam is thus supported for floating movement along the surface of the ground spaced just slightly ahead of the roller.

The beam suspension 64 generally comprises two suspension arms 72 pivotally supported at rear ends at the axis of the roller at opposing ends thereof respectively. The arms 72 extend downwardly and forwardly to respective front ends coupled to opposing ends of the beam. Each arm 72 is extendable in length comprising an outer end telescopically received within an inner end with a spring operatively connected therebetween. The spring biases the front ends of the spring arms and the beam supported thereon downwardly and forwardly to maintain the beam spaced ahead of the roller.

The spring has sufficient strength to maintain the beam in a normal working position in which the beam is spaced ahead of the main roller under normal operation of the beam in contact with the ground for levelling. As described above normal operation resulting in the positioning of the beam by the suspension in the normal working position typically comprises low load operation where the beam is working light or medium density soil or where the beam encounters few mounds or stones. The biasing of the spring is intended to be overcome so that the support rollers engage the packing roller under non-typical high load loading of the beam resulting from contact with an excessive number of hard packed mounds or large stones for example.

A plurality of support rollers 74 are mounted at spaced positions along the rear of the beam for rotation about a common axis parallel to the beam and the main packer roller axis. The spring of the beam suspension arms provide sufficient bias to the levelling beam so that the support rollers are spaced ahead of the main packing roller under normal operation. When obstacles are encountered however, the levelling beam 62 is displaced upwardly and rearwardly towards the main packing roller such that the support rollers 74 come into rolling engagement with the main packer roller and provide support to the levelling beam 62. In this instance a lighter and small gauge beam can be used as compared to prior art levelling beams used with packing rollers.

The upper flange extends upwardly to a top edge 76 which is in close proximity to the outer surface of the main packing roller at a location spaced just below the front of the roller so as to function as a scraper arranged to clear debris clinging to the roller in normal operation.

The skid shoes or end wheels 70 which function as a gauging device for gauging the height of the levelling beam relative to the ground preferably each include a blade at a leading side thereof for levelling the path of the gauging device.

The beam suspension may further comprise a hydraulic control arranged to lift the levelling beam upwardly towards the frame into a transport position.

The levelling device can be made available as a kit for attachment to various types of rollers, or the beam suspension may be integrally incorporated into the mounting of the roller on the roller frame.

As described herein FIG. 7 shows a grey mole hill leveler with black gauge wheel tires attached on an arm. The leveler device is attached to a packer, free floating to allow true levelling with the packer behind it which would all work in stone free conditions or dry easy flowing soil. In stony conditions any reasonable weight of blade would be destroyed when the first stone is contacted in prior art configurations, but the levelling beam/blade described herein uses the series of support rollers positioned behind the angle running against the very strong roller barrel for strength to work against stones. Because operators like to go 7-10 miles per hour, and the small diameter (possibly urethane covered) roller can start to turn 700 rpm and wear out quickly, the barrel is only needed as a reinforcement when the pushing is hard or a stone is encountered. To reduce wear a push away feature is incorporated into the suspension arms due to the spring bias. The roller will normally sit ¼" away from the barrel and compress the spring to come back to the barrel only when a stone/heavy levelling is encountered. FIG. 8 shows the urethane ¼" support rollers spaced away from the barrel of the main packing roller. The suspension arm having a spring inside, a slot on the outside allows the blade/beam to travel up and rearward until the rollers contact the barrel. The levelling device can be incorporated into a roller as a kit to retrofit existing rollers from various manufacturers.

Figure 15:
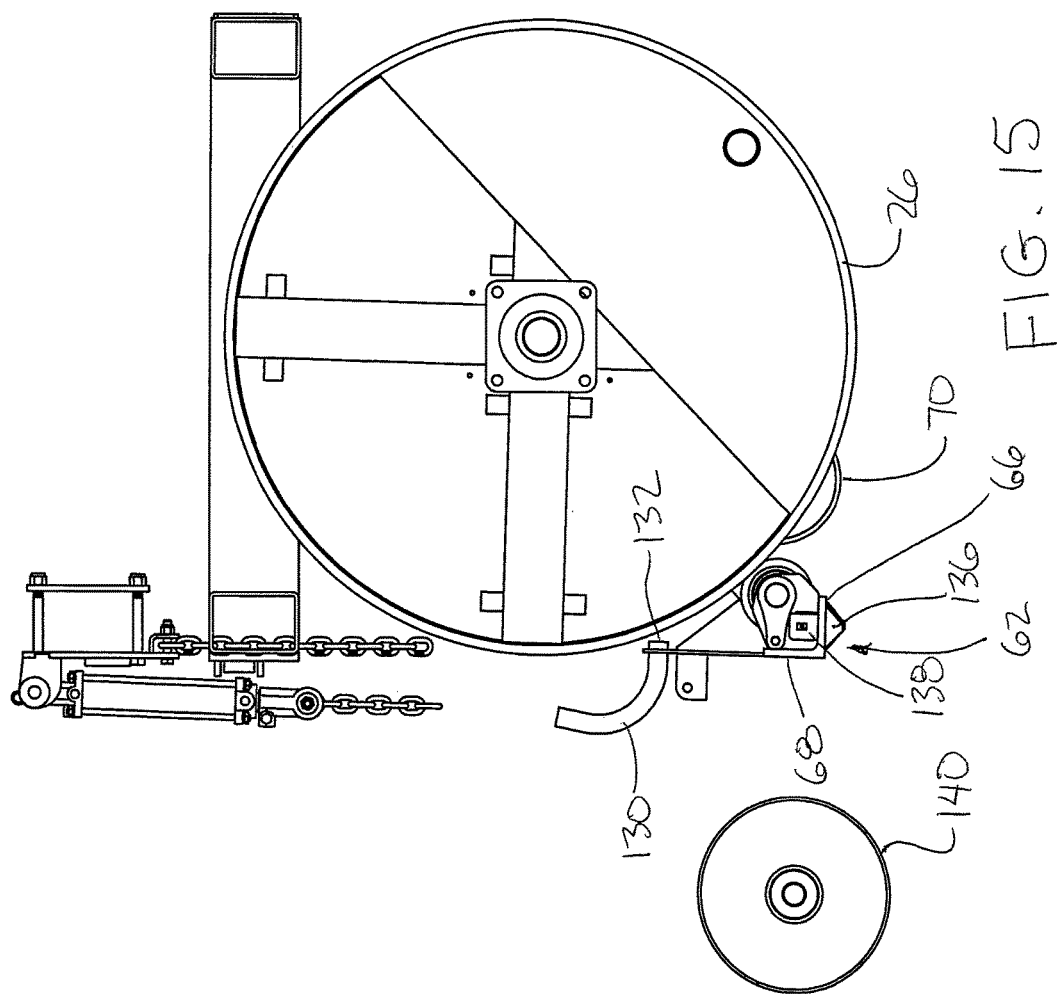
FIG. 15 is an end elevational view of the levelling device with a seeding attachment shown supported thereon.
Figure 16:
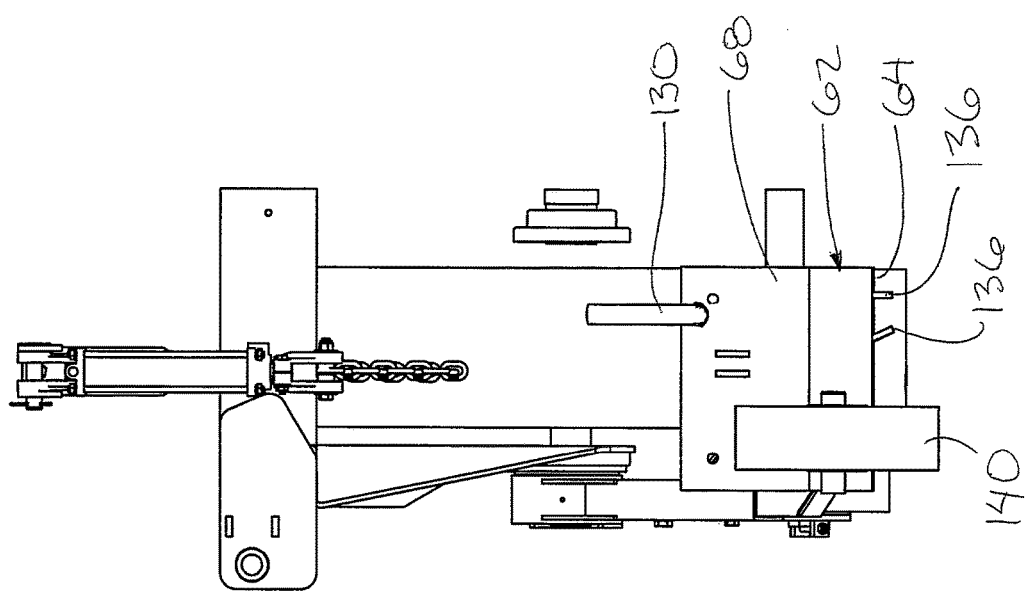
FIG. 16 is a front elevational view of a portion of the levelling beam and seeding attachment.

Turning now to FIGS. 15 and 16, a seeding attachment is shown for use with the ground levelling device 60 shown above. Further variations of the seeding attachment may be used with land rollers without a ground levelling device 60; however, the embodiment of FIGS. 15 and 16 will be described in conjunction with the ground levelling device 60 described above.

The seeding attachment includes a seed supply (not shown) for example a tank supported on the frame of the implement or more typically in the form of a separate seed cart which is towed in the forward working direction across the ground together with the land roller implement. A seed delivery mechanism is provided including a blower to deliver seed from the seed supply to a plurality of seed delivery tubes 130 having respective outlet openings 132 from which the seed is deposited. The tubes 130 are supported on the upper flange 68 of the ground levelling device adjacent the top edge 76 thereof such that the outlet openings are evenly spaced apart in the longitudinal direction of the levelling beams.

Each outlet opening 132 faces rearwardly in close proximity to the front side of the packer roller below an axis of rotation of the roller such that the outlet opening is positioned downwardly and rearwardly of a forwardmost portion of a roller thereabove. In this manner, the seed tubes are suited for blowing and directing seed therefrom rearwardly onto the front side of the roller so that the seed is deposited downwardly between the levelling beam and the packer roller. A guide may be provided on the upright flange 68 of the levelling beam for directing the seed rearwardly beyond the trailing edge of the levelling beam as it is deposited from the outlet openings of the seed tubes.

The seeding attachment further comprises a plurality of furrowing knives 136 arranged for forming respective furrows in the ground to receive the seed therein in operation. The knives 136 are evenly spaced apart along the length of the levelling beam such that one or move knives are associated with each of the seed tubes. Each knife comprises an upright plate oriented generally parallel to the forward working direction with a leading edge which is sloped downwardly and rearwardly to a lower apex of the knife.

Each knife includes an upper mounting portion 138 received upwardly through a respective aperture in the lower flange of the levelling beam within which the knives are supported so that a suitable retainer can be coupled to the mounting portion to retain the knives in place on the levelling beam such that the knives remain readily releasable therefrom as may be desired. In some embodiments, the knives extend downwardly at a lateral inclination towards one end of the levelling beam so that the resulting furrow has a lateral inclination which can be closed more easily by the packer roller after seed is deposited therein.

The seeding attachment is suspended with the levelling beam relative to the packer roller for movement relative to the ground together with the levelling beam. In this instance an additional ground following wheel 140 may be provided at each end of the levelling beam forwardly therefrom for following ground contours for optimal levelling.

To keep the transport width down the air/seed mixture is blown against the large roller tube to avoid the normal application paddles that lead to a pattern of application that is very open to the wind blowing the pattern around after the system has created an accurate pattern using the air system to distribute. The levelling blade has some dirt stirring up, but ahead of the blade. Any seeding is thus done behind the blade and ahead of the roller, a fairly narrow location. In some circumstances the seed will prefer to be broadcast uniformly across the width of the roller. Blowing the air seed mixture against the roller will be a broadcast application, and with the protection of the scraper/levelling blade device, practically wind proof allowing accurate operation during high wind conditions. In some circumstances the seed will prefer to be placed in a row. In this instance, the levelling blade can have openers attached to it to open a groove in the soil that is perpendicular to the soil surface. Then the seed can be dribbled in by either an air delivery system, or a gravity box running the length of the roller. That same opener can create a groove that is angled, and the seed can be placed there, and the roller will close the groove in a better fashion with the straight down pressure.

Figure 9:
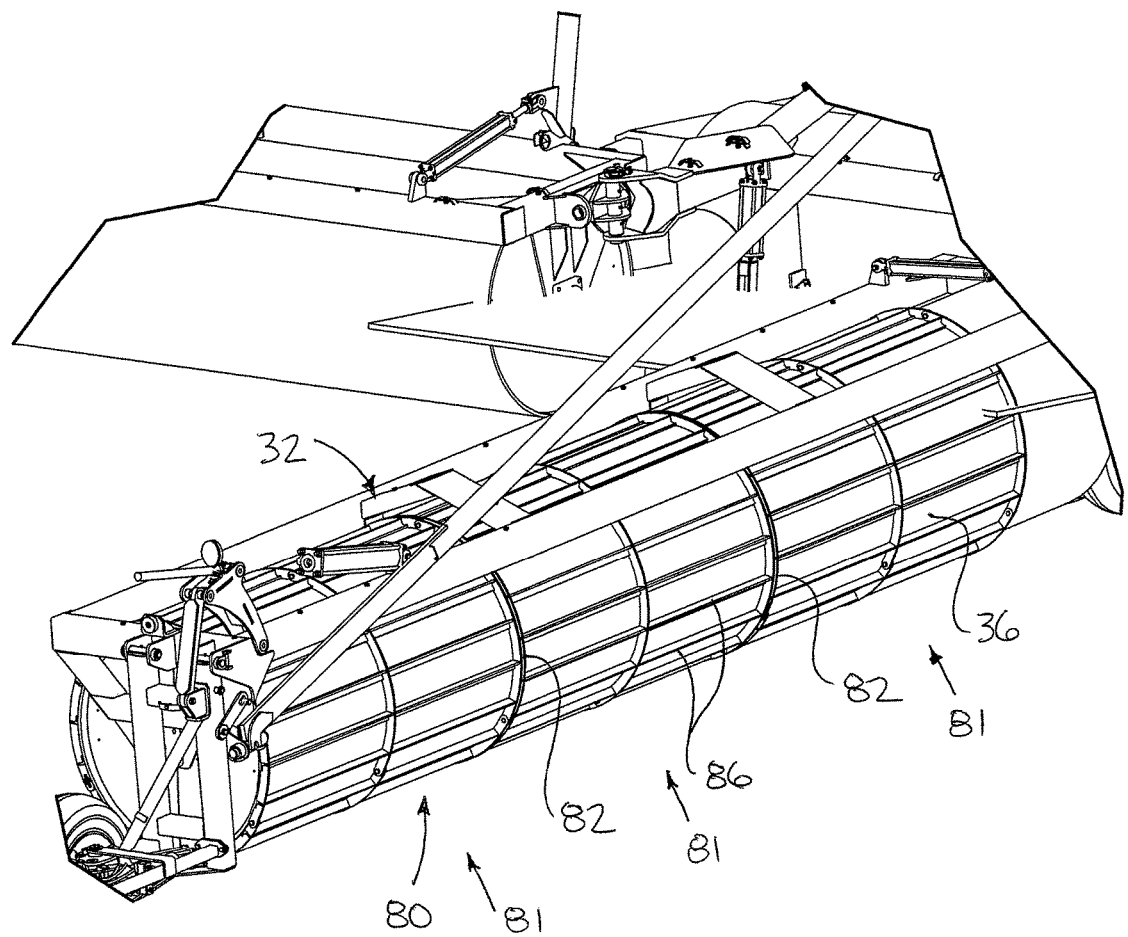
FIG. 9 is a perspective view of the cover crop roller device shown supported on one of the rollers of the land roller according to FIG. 1.
Figure 10:
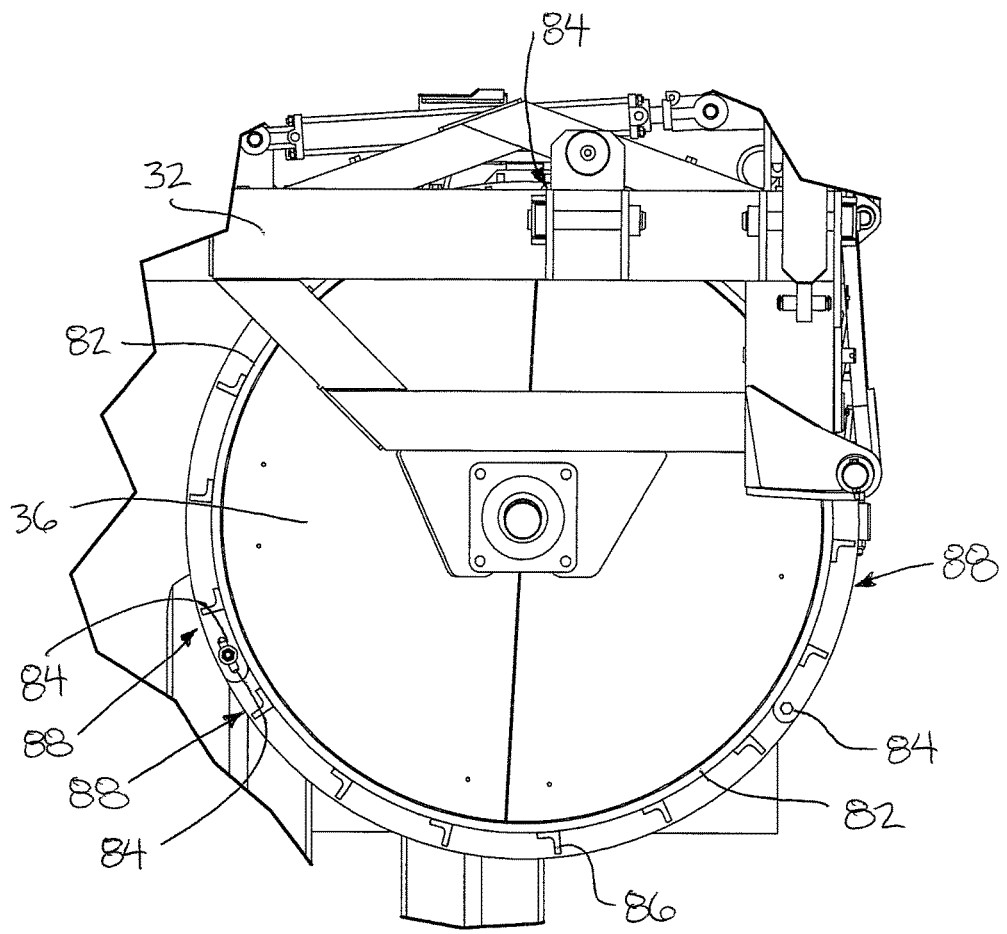
FIG. 10 is an end elevational view of the cover crop roller device according to FIG. 9.

Turning now to FIGS. 9 and 10, a cover crop roller device 80 is shown for use with the land roller implement of FIGS. 1 through 6. Typically one of the devices 80 is provided for each roller of the implement. The cover crop roller device 80 is arranged to be selectively mounted onto the roller such that the device can be readily removable and replaced as may be desired for providing a dual use to the land roller implement.

The device 80 generally comprises three longitudinally abutted portions 81 in which each portion 81 comprises a circumferential support arranged to be mounted circumferentially about the roller. The support comprises three sections in the illustrated embodiment in which each section extend circumferentially only partway about the roller such that the three sections when joined extend about the full circumference. The support more particularly comprises a plurality of annular bands 82 which are generally circular for mounting about the circumference of the roller. The bands are separated into three sections such that each of the sections of the circumferential support comprises one arcuate portion of each annular band 82. The three sections of each band comprise overlapping mounting apertures at opposing ends thereof in which the mounting apertures are arranged to bolted or hinged together for fastening the bands about the circumference of the roller.

A plurality of crop engaging members 86 are provided in the form of elongate bars which extend in the axial direction of the roller, the full width of the roller, parallel to the axis thereof, at circumferentially spaced positions about the roller. Each crop engaging member spans all of the annular bands 82 associated with the corresponding portion 81 of the circumferential support. The crop engaging members 86 span between the sides of the annular bands to project radially outward from the roller a similar distance as the bands and to project outward from the outer surface of the roller about which the bands are mounted. Each of the sections 88 of the circumferential support thus comprises a section of each band 82 and the corresponding crop engaging members 86 joined between the portions of the bands of that section.

To mount the cover crop roller device 80 onto the roller, the three sections 88 are positioned circumferentially about the roller and are fastened together at the mounting apertures 84 of the bands. The longitudinally abutted portions 81 are angularly offset from one another such that the members 86 of one portion are circumferentially spaced from the members 86 of adjacent sections. Suitable threaded fasteners are used to maintain the device 80 frictionally engaged about the roller for rolling movement therewith across the ground. When mounted on the roller, the crop engaging members are suitable for crimping a crop in a cover crop rolling operation. When subsequent use of the rollers for land rolling is desired, the fasteners at the mounting flanges 84 are removed such that the two sections of the device can be removed from diametrically opposed sides of the roller.

As described above, FIGS. 9 and 10 show the crop engaging lugs on the roller which can be implemented as a retrofit kit, and can be removed to allow a roller to be used for the regular roller functions. The lugs on the rollers are used to roll down and kill a plant in a cover crop without severing it from the root or ground attachment, and without tilling the ground, and causing weeds to germinate. Then a seeder can sow into this bed, and seeds grow without added chemical fertilizer, and the rolled plants act as cover to shade weeds while the seed row is left exposed. The goal is to crimp the stems, flatten the stand, and leave it attached to the ground so that seeding can occur into the mulch. The present invention is to use an existing land roller with the crimping/killing bars optionally fitted, and to have a kit available for sale to owners of rollers already.

Figure 17:
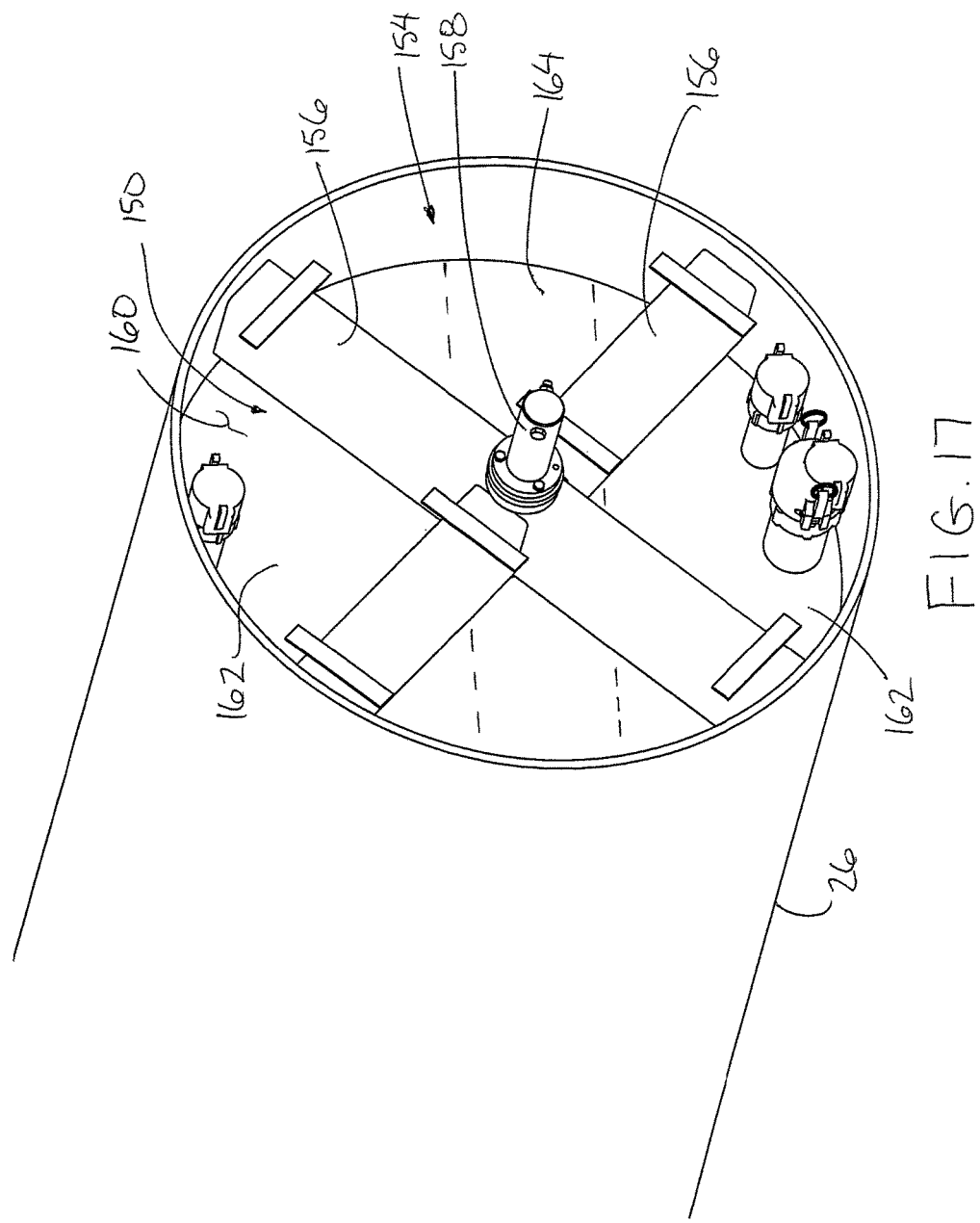
FIG. 17 is a perspective view of a conversion kit for enclosing the open end of a packer roller.
Figure 18:
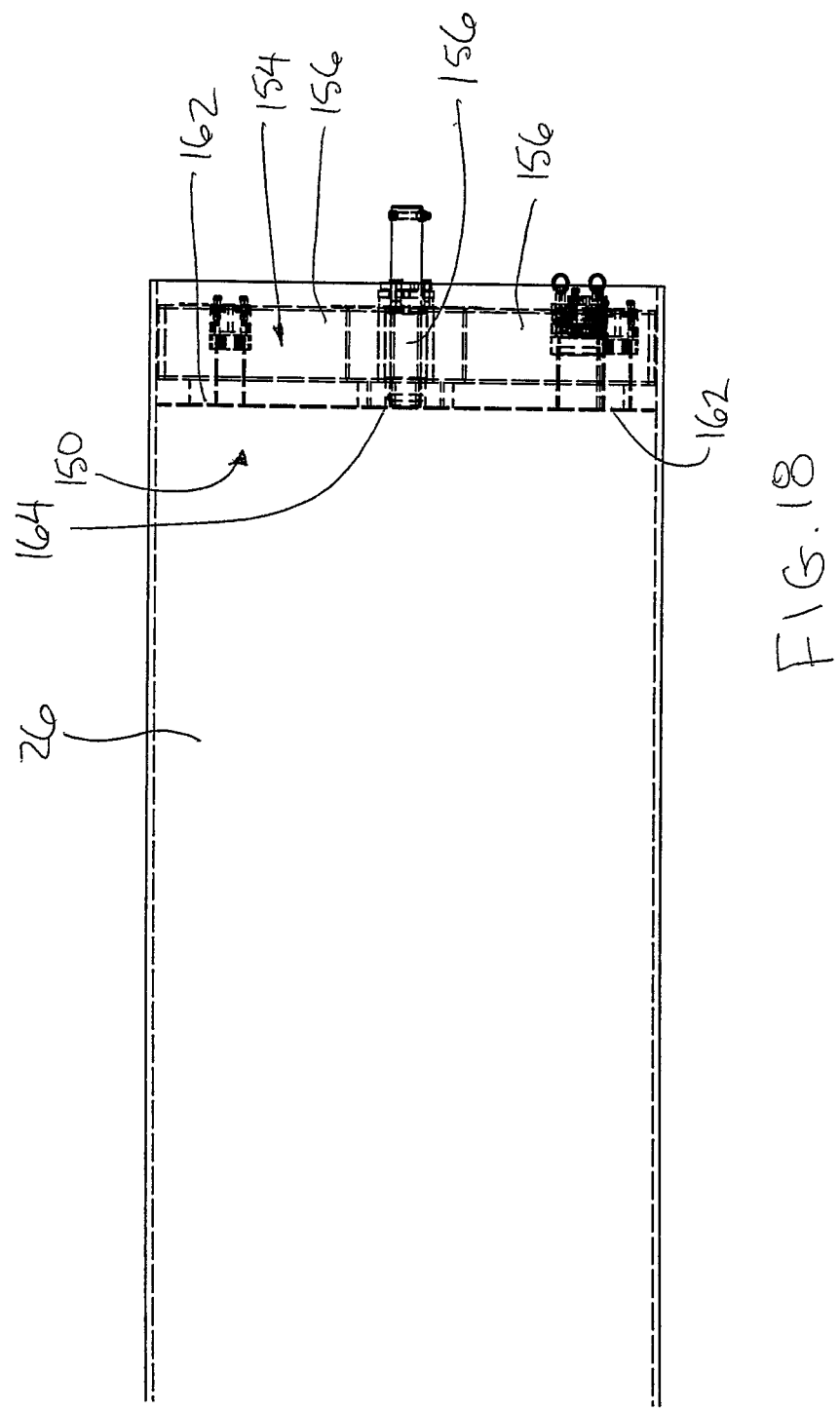
FIG. 18 is a sectional view along an axis of the roller according to FIG. 17.

Turning now to FIGS. 17 and 18, a conversion kit is illustrated for a land roller implement of the type having an open ended packer roller for converting the roller into an enclosed container which can be selectively filled with water for added weight as may be desired. The conversion kit 150 is suitable for use with a land roller implement 10 of the type described above having a main frame supporting a hitch member 20 thereon for connection to a towing vehicle and one or more packer rollers supported on the main frame for rotation about respective horizontal roller axes for rolling movement along the ground in a forward working direction of the towing vehicle. The packer roller typically comprises a cylindrical roller surface 152 surrounding a hollow interior spanning in an axial direction of the roller between two open ends 154 at opposite ends of the roller. A roller support is provided at each of the opposed ends in the form of four spokes 156 formed of square tubing which extend radially outward from the roller axis to the surrounding cylindrical roller surface 152 at right angles to one another so as to be evenly circumferentially spaced. The spokes provide support between a central pivot shaft 158 at the roller axis and the surrounding cylindrical roller surface so that the pivot shafts 158 at opposing ends of the roller can be rotatably supported on the frame of the land roller implement to support the rollers for rolling movement along the ground.

The conversion kit 150 generally comprises a separate end panel associated with each of the opposed ends of the roller so as to be arranged to fully span and enclose the respective open end of the roller when the end panel is assembled in relation thereto. Each end panel 160 comprises three separate panel members in which each of the separate panel members is arranged to be fully inserted in to the hollow interior of the cylindrical roller surface through the openings between adjacent ones of the spokes at the ends of the roller. Each of the three panel members forming each end panel are separately inserted between the spokes and then assembled together to form the end panel 160 at a location spaced inwardly from the end support of spokes 156.

Each end panel comprises two first panel members 162 which are substantially identical in shape to one another so as to be generally semi-circular having a curved edge forming a portion of the periphery of the end panel and an opposing straight edge arranged to be joined with other panels. Each first panel member 62 further comprises an axis port 164 therein arranged to receive a respective mating cap member mounted thereon for selectively enclosing the axis port. One of the ports of the two first panel members 162 can be used for filling while the other provides a vent for example. Each end panel 160 further comprises a second panel member 164 joined between the two first panel members at the roller axis. Each of the panel members may be formed with suitable edges for ease of mating connection with the other panel members when assembled together to form the end panel enclosing the open end of the roller. Once assembled the panel members are preferably welded in place to provide a sealed enclosure across the open end of the roller.

The pivot shaft is supported into the end of the roller tube by the X shape of heavy walled tubing which is normally the only mount in the end of the roller. Some growers wish to have the additional weight of water in the roller, so a thinner low cost bulkhead can be placed inside the roller with support from the X braced end. This results in a substantial saving in material to have a dependable water tight roller end. This bulkhead is an optional welded in assembly, made of 3 pieces to allow a retrofit to an existing land roller, and features both a larger 3 inch water flow hole and a smaller opposing air vent. The unique feature is using the X brace as a substantial support for a lighter bulkhead, designed in a 3 piece retrofit kit for all roller models with an X brace end shaft construction.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An agricultural implement for movement across the ground in a forward working direction of a towing vehicle, the agricultural implement comprising:
a central frame;
a hitch member connected to the central frame and arranged for connection to the towing vehicle for movement therewith in the forward working direction;
a first wing which is elongate in a longitudinal direction between an inner end pivotally coupled on the central frame and an opposing outer end;
a second wing which is elongate in a longitudinal direction between an inner end pivotally coupled on the central frame and an opposing outer end;
the first and second wings being pivotal about respective upright axes between respective working positions spanning laterally outward in opposing directions from the central frame so as to be oriented transversely to the forward working direction and respective transport positions extending rearwardly from the central frame such that the longitudinal directions of the first and second wings extend generally in the forward working direction;
a first brace member coupled to the first wing for pivotal movement relative to the first wing about a first axis extending generally in the longitudinal direction of the first wing such that in the working position of the first wing the first brace member is pivotal between a latched position extending generally forwardly and inwardly from the first wing to the central frame in latched connection with the central frame and a released position extending generally upwardly from the first wing; and
a second brace member coupled to the second wing for pivotal movement relative to the second wing about a second axis extending generally in the longitudinal direction of the second wing such that in the working position of the second wing the second brace member is pivotal between the latched position extending generally forwardly and inwardly from the second wing to the central frame in latched connection with the central frame and a released position extending generally upwardly from the first wing.

2. The agricultural implement according to claim 1 wherein each brace member is pivotally coupled to a front end of the respective wing.

3. The agricultural implement according to claim 1 wherein each brace member is pivotally coupled at longitudinally spaced positions on the respective wing.

4. The agricultural implement according to claim 1 wherein each of the first and second axes is oriented at a downward inclination from the inner end towards the opposing outer end of the respective wing.

5. The agricultural implement according to claim 1 wherein each of the first and second brace members are pivotal with the respective wings between the transport position and the working position thereof in the released position of the first and second brace members.

6. The agricultural implement according to claim 1 wherein there is provided a cradle member fixed on the central frame in association with each brace member and a connecting member on a forward end of each brace member, each connecting member arranged to be slidably received through an open top end of the respective cradle member in the latched position so as to retain the wings in the working position as the central frame is displaced in the forward working direction.

7. The agricultural implement according to claim 6 wherein each connecting member comprises a pivot shaft oriented in the forward working direction in the latched position, each pivot shaft being arranged to be received in the respective cradle member such that the brace member is pivotal about a respective pivot axis oriented generally in the forward working direction.

8. The agricultural implement according to claim 1 wherein the central frame supports a packer roller thereon for rolling movement in the forward working direction and each wing comprises a frame including a pair of frame members spanning in the longitudinal direction of the wing above a respective packer roller oriented for rolling movement in the forward working direction in the working position of the wings, each brace member being pivotally coupled to the respective wing at an outermost end of the brace member at a location spaced below the frame members of the frame of the respective wing.

* * * * *